United States Patent
Ueda

(10) Patent No.: US 8,453,259 B2
(45) Date of Patent: May 28, 2013

(54) AUTHENTICATION APPARATUS, AUTHENTICATION SYSTEM, AUTHENTICATION METHOD, AND AUTHENTICATION PROGRAM USING BIOMETRIC INFORMATION FOR AUTHENTICATION

(75) Inventor: Takashi Ueda, Kashiba (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1266 days.

(21) Appl. No.: 12/068,656

(22) Filed: Feb. 8, 2008

(65) Prior Publication Data

US 2008/0201771 A1  Aug. 21, 2008

(30) Foreign Application Priority Data

Feb. 20, 2007  (JP) .................................. 2007-40054

(51) Int. Cl.
*G06F 21/00* (2006.01)
(52) U.S. Cl.
USPC .............................................. 726/30; 726/29
(58) Field of Classification Search
None
See application file for complete search history.

(56) References Cited

U.S. PATENT DOCUMENTS

| | | | | |
|---|---|---|---|---|
| 7,437,457 B1 * | 10/2008 | Eisendrath et al. | ............ | 709/225 |
| 7,694,146 B2 * | 4/2010 | Friend | ............................ | 713/182 |
| 2004/0205243 A1 * | 10/2004 | Hurvig et al. | .................. | 709/245 |
| 2006/0165262 A1 | 7/2006 | Genda | | |
| 2008/0098464 A1 * | 4/2008 | Mizrah | ............................. | 726/5 |

FOREIGN PATENT DOCUMENTS

| | | |
|---|---|---|
| JP | 2000-276018 A | 10/2000 |
| JP | 2002-215590 | 8/2002 |
| JP | 2002-258975 | 9/2002 |
| JP | 2004-259147 | 9/2004 |
| JP | 2006-113953 | 4/2006 |
| JP | 2006-119719 | 5/2006 |
| JP | 2006-202207 A | 8/2006 |

OTHER PUBLICATIONS

Notice of Ground of Rejection in JP 2007-040054 dated Dec. 9, 2008, and an English Translation thereof.

* cited by examiner

*Primary Examiner* — Michael S McNally
*Assistant Examiner* — Carlton Johnson
(74) *Attorney, Agent, or Firm* — Buchanan Ingersoll & Rooney PC

(57) ABSTRACT

In order to enable multiple logins by a same user, the authentication server includes a registration portion to store a user record including a fingerprint image for authentication of identity of a user and owner authentication information stored in a IC card issued to the user; an identity authentication portion to compare a fingerprint image received from one of MFPs with the one included in the user record for authentication; a first permission portion to transmit a permission signal permitting login based on the authenticated fingerprint image to the MFP that transmitted the fingerprint image; an owner authentication portion to compare owner authentication information received from one of the MFPs with the one included in the user record for authentication; and a second permission portion to transmit a permission signal permitting login based on the authenticated owner authentication information to the MFP that transmitted the owner authentication information.

30 Claims, 14 Drawing Sheets

F I G. 3
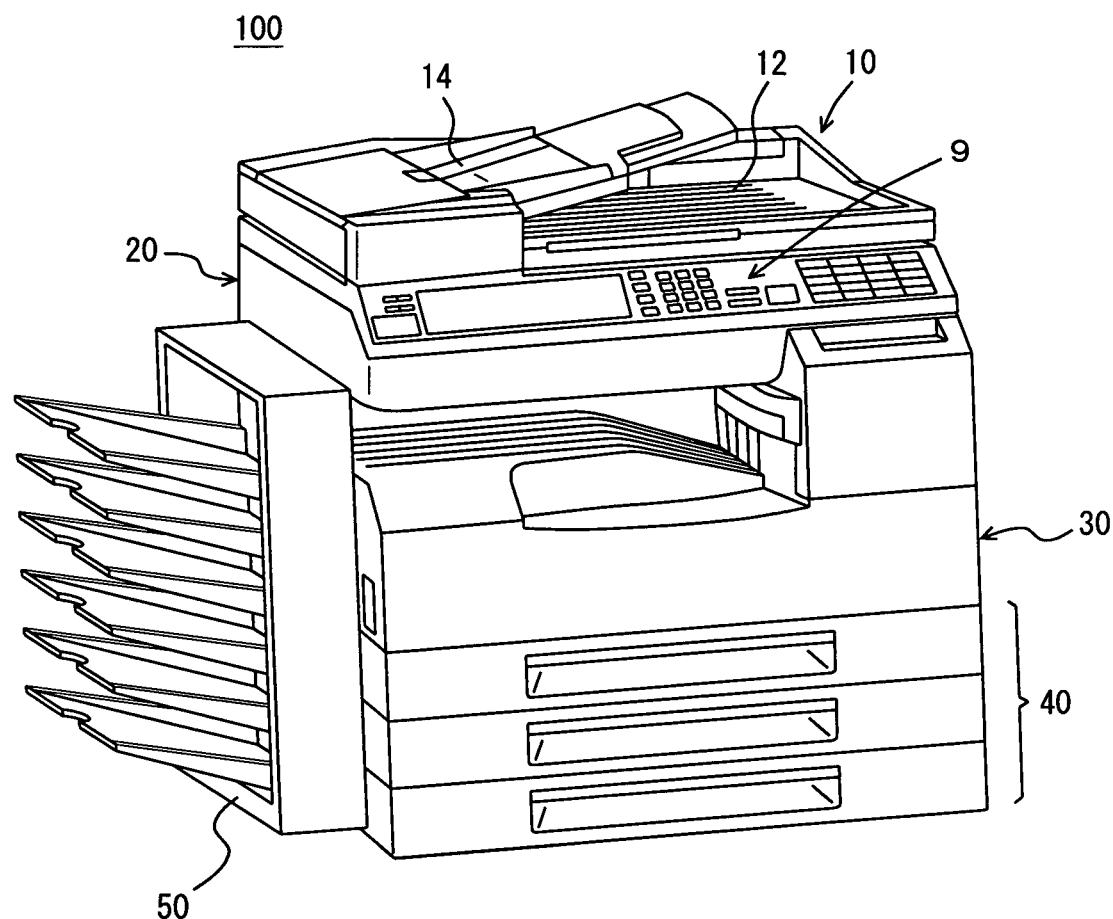

FIG. 6

USER RECORD

| FIELD |
| --- |
| RECORD NO. |
| IDENTITY AUTHENTICATION INFORMATION |
| OWNER AUTHENTICATION INFORMATION |
| FIRST RESTRICTION INFORMATION |
| SECOND RESTRICTION INFORMATION |

FIG. 7

PERMISSION RECORD

| ITEM | CONTENT |
| --- | --- |
| RECORD NO. | RECORD NO. OF USER RECORD |
| IDENTITY AUTHENTICATION | ON or OFF |
| OWNER AUTHENTICATION | ON or OFF |
| APPARATUS INFORMATION 1 | APPARATUS ID |
| APPARATUS INFORMATION 2 | APPARATUS ID |
| LOGIN DATE AND TIME 1 | DATE AND TIME WHEN LOGIN WAS PERMITTED |
| LOGIN DATE AND TIME 2 | DATE AND TIME WHEN LOGIN WAS PERMITTED |

F I G. 1 0
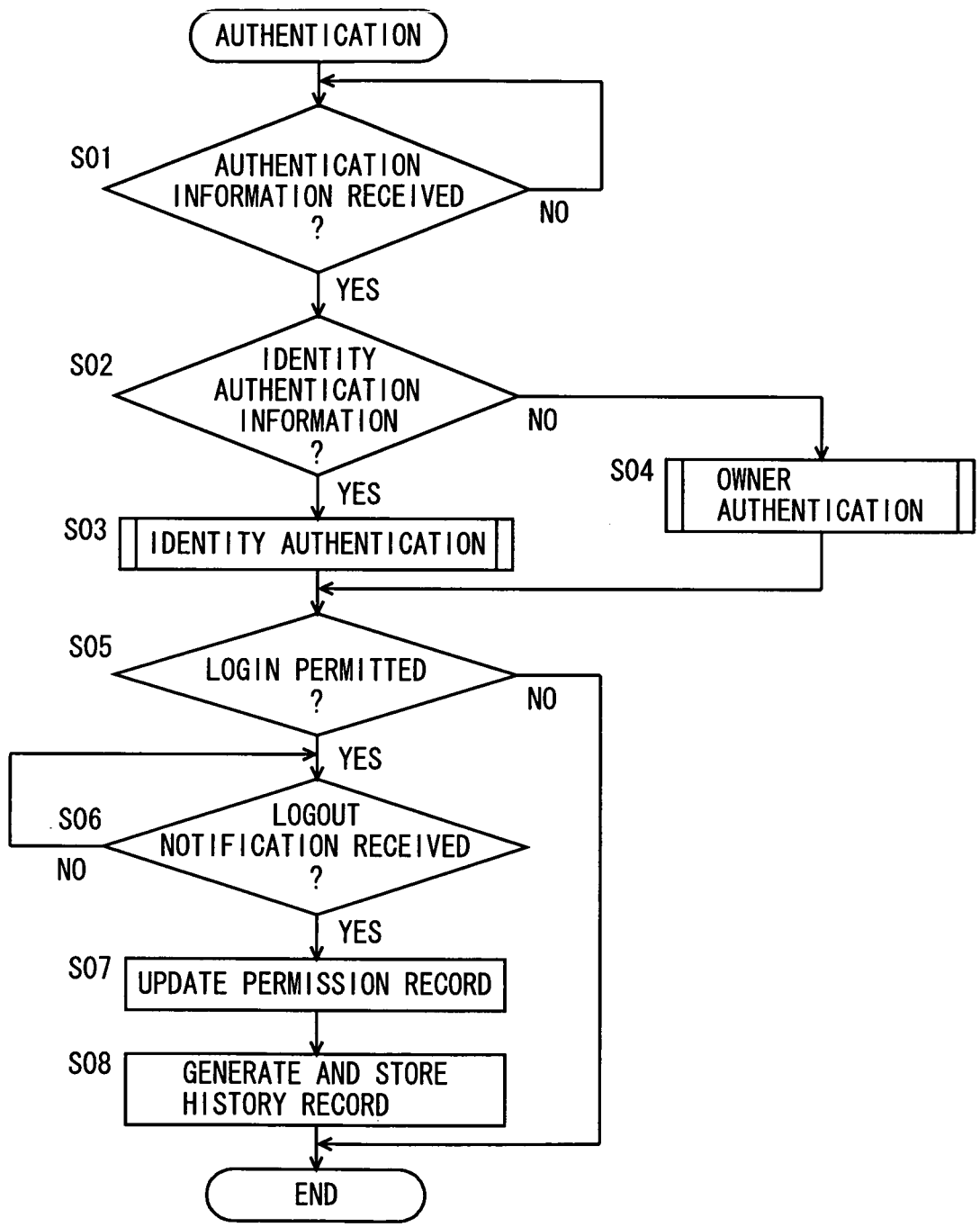

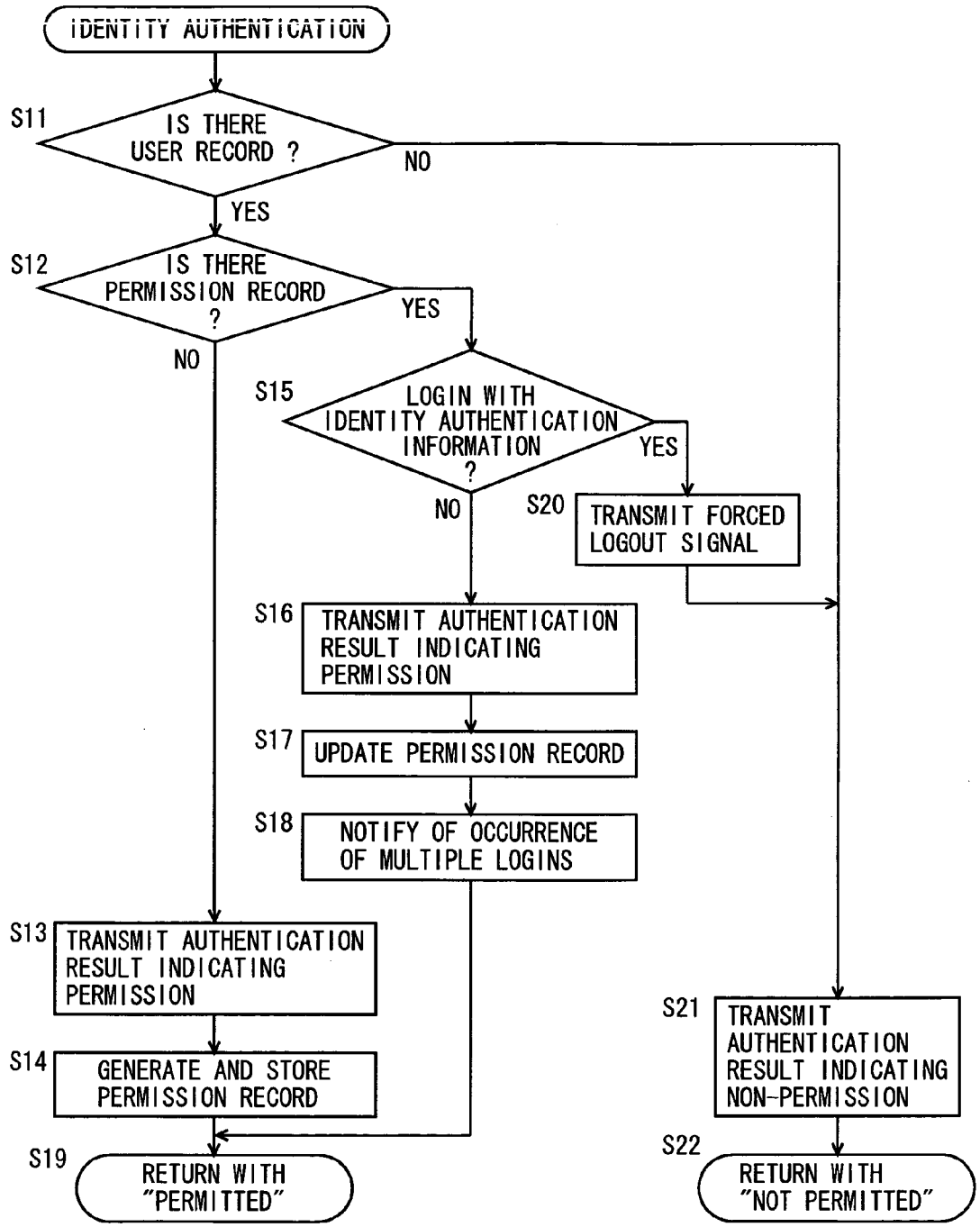

F I G. 1 7
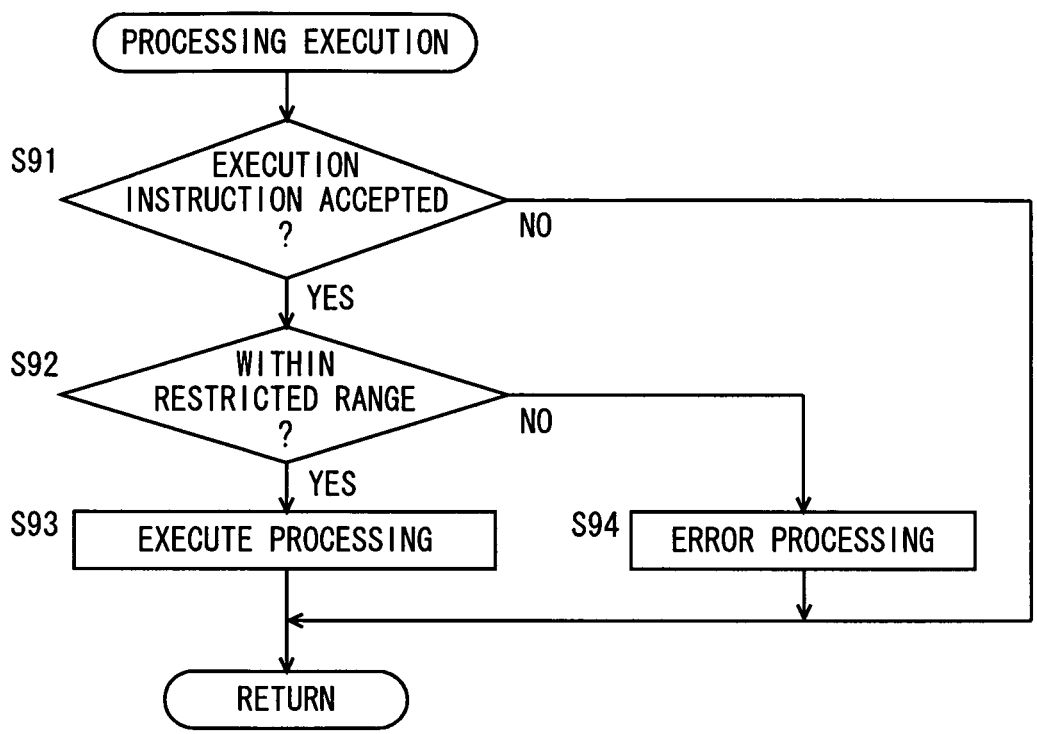

AUTHENTICATION APPARATUS, AUTHENTICATION SYSTEM, AUTHENTICATION METHOD, AND AUTHENTICATION PROGRAM USING BIOMETRIC INFORMATION FOR AUTHENTICATION

This application is based on Japanese Patent Application No. 2007-40054 filed with Japan Patent Office on Feb. 20, 2007, the entire content of which is hereby incorporated by reference.

BACKGROUND OF THE INVENTION

1. Field of the Invention

The present invention relates to an authentication apparatus, an authentication system, an authentication method, and an authentication program, and more particularly to an authentication apparatus, an authentication system, an authentication method, and an authentication program that use biometric information for authentication.

2. Description of the Related Art

In recent years, it has become common to authenticate an operator of a multi-function peripheral (MFP) or a printer in order to permit the use for only the users registered in advance, or to restrict the processing allowed to execute depending on the operators. The technique for identifying an operator includes "identity authentication" and "owner authentication". As the identify authentication technique, biometrics authentication is known which checks biometric information, such as a fingerprint, for authentication of identity of an individual. The technique using the biometric authentication for authentication of an operator is disclosed, e.g., in Japanese Laid-Open Publication Nos. 2000-276018 and 2006-202207.

Meanwhile, the owner authentication is a technique to authenticate an operator using identification information stored in an IC card or the like. With the identity authentication, the security level will improve as it is difficult to forge the fingerprint or the like, although it is not possible to delegate a copying operation to an unregistered person (to whom the use is not authorized). By comparison, with the owner authentication by the IC card, it is possible to delegate the copying operation to an unregistered person by handing the IC card to the person.

There is a case where an authentication server collectively performs authentication of users of a plurality of MFPs. In the case where the identity authentication is performed, multiple logins by a same person at the same time are not allowed. In the case where the owner authentication is performed, multiple logins with a same IC card at the same time are not allowed. As such, in either case, it is not possible for a registered person to log in and at the same time delegate a copying operation to an unregistered person, for example.

SUMMARY OF THE INVENTION

The present invention has been accomplished in view of the foregoing problems, and an object of the present invention is to provide an authentication apparatus, an authentication system, an authentication method and an authentication program that enable multiple logins of a same user.

In order to achieve the object, according to an aspect of the present invention, there is provided an authentication apparatus which includes: a storage portion to store a user record including identity authentication information for authentication of identity of a user and owner authentication information assigned to a possession of the user; an identity authentication portion to compare identity authentication information received from one of a plurality of information processing apparatuses with the identity authentication information included in the user record for authentication; a first permission portion to transmit a permission signal permitting login based on the identity authentication information authenticated by the identity authentication portion to the one of the plurality of information processing apparatuses that transmitted the identity authentication information; an owner authentication portion to compare owner authentication information received from one of the plurality of information processing apparatuses with the owner authentication information included in the user record for authentication; and a second permission portion to transmit a permission signal permitting login based on the owner authentication information authenticated by the owner authentication portion to the one of the plurality of information processing apparatuses that transmitted the owner authentication information.

According to another aspect of the present invention, there is provided an authentication system including a plurality of information processing apparatuses and an authentication apparatus, wherein the authentication apparatus includes: a communication portion to communicate with the plurality of information processing apparatuses; a storage portion to store a user record including identity authentication information for authentication of identity of a user and owner authentication information for identification of the user; an identity authentication portion to compare identity authentication information received from one of the plurality of information processing apparatuses with the identity authentication information included in the user record for authentication; a first permission portion to transmit a permission signal permitting login based on the identity authentication information authenticated by the identity authentication portion to the one of the plurality of information processing apparatuses that transmitted the identity authentication information; an owner authentication portion to compare owner authentication information received from one of the plurality of information processing apparatuses with the owner authentication information included in the user record for authentication; and a second permission portion to transmit a permission signal permitting login based on the owner authentication information authenticated by the owner authentication portion to the one of the plurality of information processing apparatuses that transmitted the owner authentication information.

According to a further aspect of the present invention, there is provided an authentication method which includes: a step of storing a user record including identity authentication information for authentication of identity of a user and owner authentication information for identification of the user; an identity authentication step of comparing identity authentication information received from one of a plurality of information processing apparatuses with the identity authentication information included in the user record for authentication; a step of transmitting a permission signal permitting login based on the identity authentication information authenticated in the identity authentication step to the one of the plurality of information processing apparatuses that transmitted the identity authentication information; an owner authentication step of comparing owner authentication information received from one of the plurality of information processing apparatuses with the owner authentication information included in the user record for authentication; and a step of transmitting a permission signal permitting login based on the owner authentication information authenticated in the owner authentication step to the one of the plurality of information processing apparatuses that transmitted the owner authentication information.

According to yet another aspect of the present invention, there is provided an authentication program embodied on a computer readable medium for causing a computer to execute processing including: a step of storing a user record including identity authentication information for authentication of identity of a user and owner authentication information for identification of the user; an identity authentication step of comparing identity authentication information received from one of a plurality of information processing apparatuses with the identity authentication information included in the user record for authentication; a step of transmitting a permission signal permitting login based on the identity authentication information authenticated in the identity authentication step to the one of the plurality of information processing apparatuses that transmitted the identity authentication information; an owner authentication step of comparing owner authentication information received from one of the plurality of information processing apparatuses with the owner authentication information included in the user record for authentication; and a step of transmitting a permission signal permitting login based on the owner authentication information authenticated in the owner authentication step to the one of the plurality of information processing apparatuses that transmitted the owner authentication information.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a perspective view of an MFP.

FIG. 6 shows an example of the format of a user record.

FIG. 7 shows an example of the format of a permission record.

FIG. 10 is a flowchart illustrating an example of the flow of authentication processing.

FIG. 11 is a flowchart illustrating an example of the flow of identity authentication processing.

FIG. 17 is a flowchart illustrating an example of the flow of processing execution processing.

DESCRIPTION OF THE PREFERRED EMBODIMENTS

Figure 1:
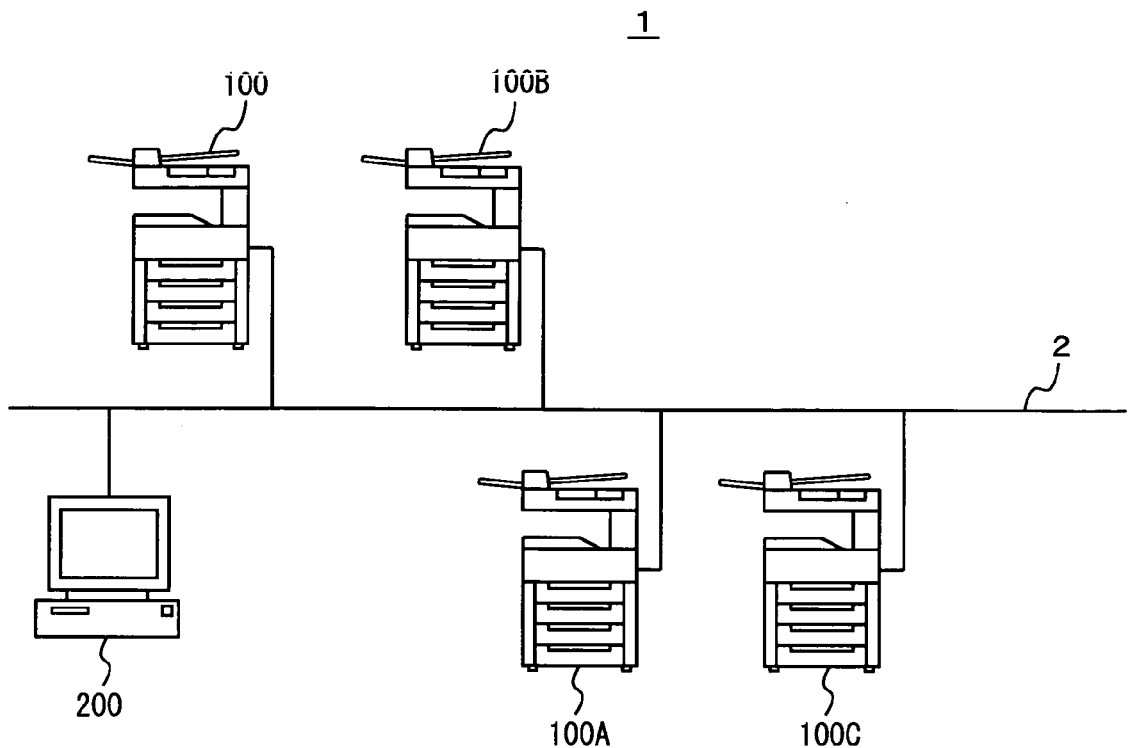
FIG. 1 is a schematic diagram of an authentication system according to an embodiment of the present invention.

Hereinafter, embodiments of the present invention will be described with reference to the drawings. In the following description, like reference characters denote like parts, which have like names and functions, and therefore, detailed description thereof will not be repeated.

FIG. 1 is a schematic diagram of an authentication system according to an embodiment of the present invention. Referring to FIG. 1, an authentication system 1 includes multi-function peripherals (MFPs) 100, 100A, 100B, and 100C, and an authentication server 200, which are connected to a network 2.

MFPs 100, 100A, 100B, and 100C are examples of the information processing apparatus. They are identical in hardware configuration and function, and thus, MFP 100 is herein explained representatively. Authentication server 200, which is a common computer, has an authentication function for authentication of users, and is responsible for authentication of the users of MFPs 100, 100A, 100B, and 100C. MFPs 100, 100A, 100B, and 100C and authentication server 200 are connected to each other via network 2, which enables communication therebetween.

Network 2 is a local area network (LAN), which may be wired or wireless. However, not restricted thereto, network 2 may be a wide area network (WAN), a network using public line, or the like.

While authentication system 1 includes authentication server 200 and four MFPs 100, 100A, 100B, and 100C in this example, their numbers are not limited thereto. All that is needed is that the system includes one authentication server 200 and at least one MFP.

Figure 2:
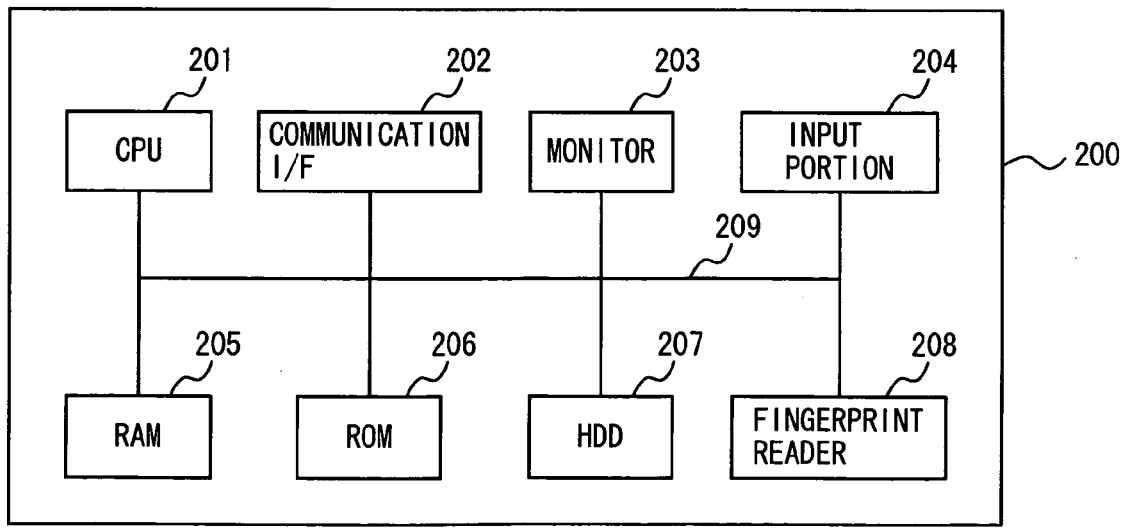
FIG. 2 shows an example of the hardware configuration of an authentication server.

FIG. 2 shows an example of the hardware configuration of the authentication server. Referring to FIG. 2, authentication server 200 includes a central processing unit (CPU) 201, a random access memory (RAM) 205 used as a working area for CPU 201, a read only memory (ROM) 206 for storing a program to be executed by CPU 201, a hard disk drive (HDD) 207, a communication interface (I/F) 202 for connecting authentication server 200 to network 2, an input portion 204 provided with a keyboard, mouse and the like, a monitor 203 for displaying information, and a fingerprint reader 208.

Fingerprint reader 208 includes a photoelectric conversion element such as a charge coupled device (CCD), and reads a fingerprint of the user of MFP 100 and outputs a fingerprint image to CPU 201.

FIG. 3 is a perspective view of the MFP. Referring to FIG. 3, MFP 100 includes an automatic document feeder (ADF) 10, an image reading portion 20, an image forming portion 30, a paper feeding portion 40, and a post processing portion 50.

ADF 10 automatically delivers a plurality of originals, set on an original feed tray 14, one by one to a predetermined original reading position on a platen glass of image reading portion 20, and discharges the original having its original image read by image reading portion 20 onto an original discharge tray 12. Image reading portion 20 includes a light source that irradiates the original delivered to the original reading position with light, and a photoelectric conversion element that receives the light reflected from the original, and scans the original image in accordance with the original size. The photoelectric conversion element converts the received light into image data of electric signals, and outputs the same to image forming portion 30. Paper feeding portion 40 delivers sheets of paper stored in a paper feed tray to image forming portion 30.

Image forming portion 30 forms an image by well-known electrophotography. It performs various data processing including shading compensation on the image data input from image reading portion 20, and, based on the processed image data, forms an image on a sheet of paper fed by paper feeding portion 40.

Post processing portion 50 discharges the recording sheet on which the image was formed. Post processing portion 50 has a plurality of paper discharge trays to allow sorting of the sheets having the images formed thereon for discharge. Post processing portion 50 also has a punching portion and a stapling portion to allow the discharged sheets to be punched or stapled. MFP 100 also includes an operation panel 9 on a top surface thereof, which serves as a user interface with the user.

While MFPs 100, 100A, 100B, and 100C are shown as the examples of the information processing apparatus in the present embodiment, the information processing apparatus may be any apparatus, besides the MFPs, as long as it can restrict the user(s) to whom the use is authorized, such as a scanner, a printer, a facsimile, a personal computer, or the like.

Figure 4:
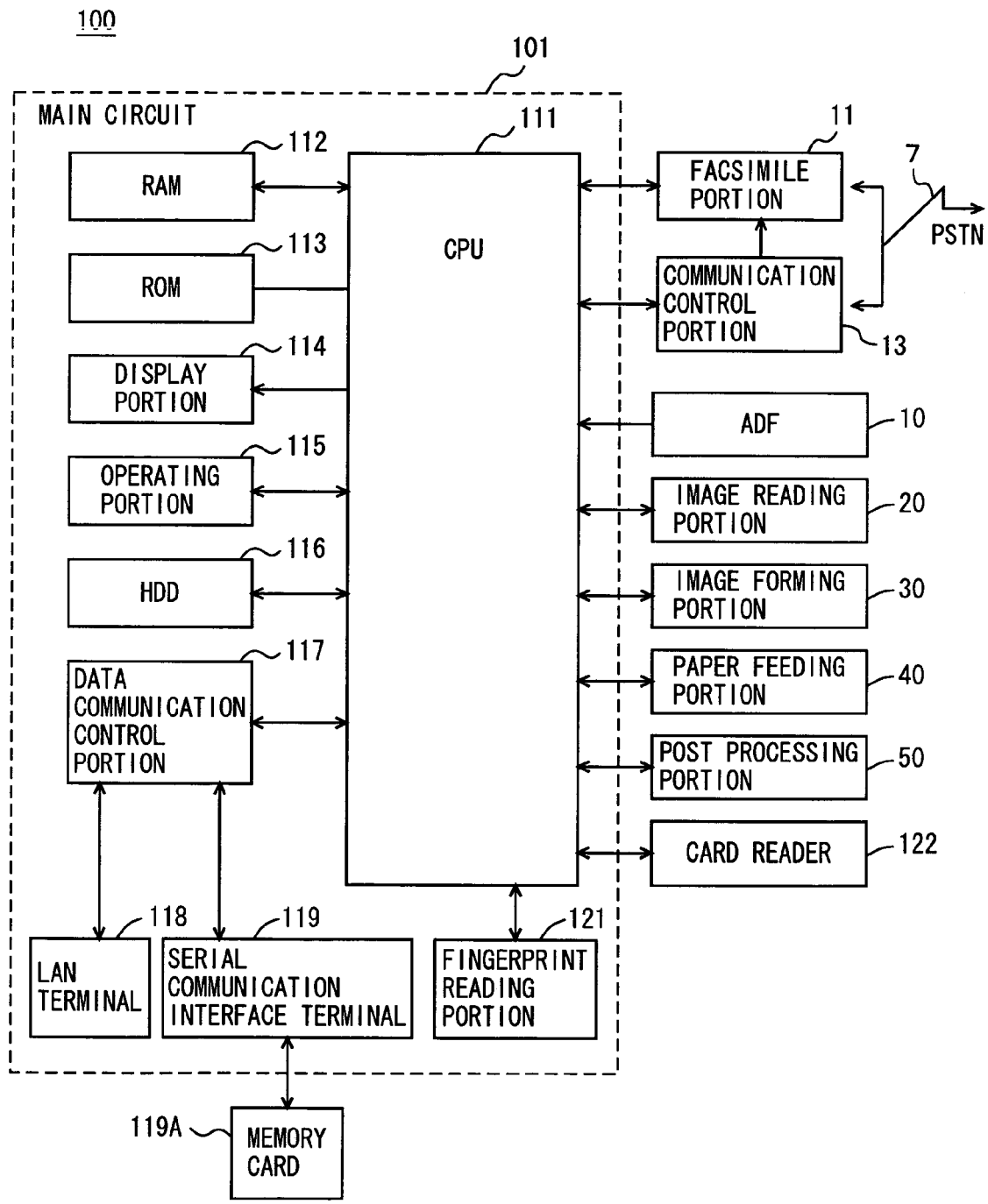
FIG. 4 is a block diagram showing an example of the circuit configuration of the MFP.

FIG. 4 is a block diagram showing an example of the circuit configuration of the MFP. Referring to FIG. 4, MFP 100 includes a main circuit 101, a facsimile portion 11, a communication control portion 13, and a card reader 122. Main circuit 101 is connected to ADF 10, image reading portion 20, image forming portion 30, paper feeding portion 40, post processing portion 50, and a card reader 122.

Main circuit 101 includes a CPU 111, a RAM 112 used as a working area for CPU 111, a ROM 113 for storing a program executed by CPU 111 and the like, a display portion 114, an operating portion 115, an HDD 116 as a mass storage, a data communication control portion 117, and a fingerprint reading portion 121.

CPU 111 is connected with display portion 114, operating portion 115, HDD 116, data communication control portion 117, and fingerprint reading portion 121 and is responsible for overall control of main circuit 101. CPU 111 is also connected with facsimile portion 11, communication control portion 13, ADF 10, image reading portion 20, image forming portion 30, paper feeding portion 40, post processing portion 50, and a card reader 122, and is responsible for overall control of MFP 100.

Display portion 114 is a display device such as a liquid crystal display (LCD), an organic electro-luminescence display (ELD) or the like, and displays an instruction menu for the user, information about acquired image data, and others. Operating portion 115 is provided with a plurality of keys, and accepts input of data such as instructions, characters and numerical characters, according to the key operations of the user. Operating portion 115 includes a touch panel provided on display portion 114. Fingerprint reading portion 121 includes a photoelectric conversion element such as a CCD, and reads a fingerprint of the user of MFP 100 and outputs the fingerprint image to CPU 111. Card reader 122 communicates with the IC card in a wireless manner to receive therefrom the owner authentication information stored in the IC card, and outputs the owner authentication information to CPU 111. Display portion 114, operating portion 115, fingerprint reading portion 121, and card reader 122 constitute operation panel 9 provided on the top surface of MFP 100.

Data communication control portion 117 includes a LAN terminal 118 that is an interface for communication according to a communication protocol such as TCP (Transmission Control Protocol) or FTP (File Transfer Protocol), and a serial communication interface terminal 119 for serial communication. Data communication control portion 117 transmits and receives data to and from an external apparatus connected to LAN terminal 118 or serial communication interface terminal 119, in accordance with an instruction from CPU 111.

When a LAN cable for connection to network 2 is connected to LAN terminal 118, data communication control portion 117 communicates with another MFP or computer connected via LAN terminal 118. Data communication control portion 117 also communicates with another computer connected to the Internet.

When an apparatus is connected to serial communication interface terminal 119, data communication control portion 117 communicates with the apparatus connected to serial communication interface terminal 119, which may be, e.g., a digital camera, a digital video camera, or a personal digital assistant, to input/output image data. A memory card 119A having a flash memory built therein can also be connected to serial communication interface terminal 119. CPU 111 controls data communication control portion 117 to read a program to be executed by CPU 111 from memory card 119A, and stores the read program in RAM 112 for execution.

It is noted that the recording medium for storing the program to be executed by CPU 111 is not restricted to memory card 119A. It may be a flexible disk, a cassette tape, an optical disc (CD-ROM (Compact Disc-ROM), MO (Magnetic Optical Disc), MD (Mini Disc), DVD (Digital Versatile Disc)), an IC card (including a memory card), an optical card, or a semiconductor memory such as a masked ROM, an EPROM (Erasable Programmable ROM), an EEPROM (Electronically EPROM), or the like. Alternatively, CPU 111 may download the program from a computer connected to the Internet and store the same in HDD 116, or a computer connected to the Internet may write the program to HDD 116, and thereafter, the program stored in HDD 116 may be loaded to RAM 112 for execution by CPU 111. As used herein, the "program" includes, not only the program directly executable by CPU 111, but also a source program, a compressed program, an encrypted program, and others.

Communication control portion 13 is a modem for connecting CPU 111 to a public switched telephone network (PSTN) 7. MFP 100 is assigned a telephone number in PSTN 7 in advance. When there is a call from a facsimile machine connected to PSTN 7 to the telephone number assigned to MFP 100, communication control portion 13 detects the call. Upon detection of the call, communication control portion 13 establishes the call to enable communication of facsimile portion 11.

Facsimile portion 11 is connected to PSTN 7, and transmits facsimile data to or receives facsimile data from PSTN 7.

Figure 5:
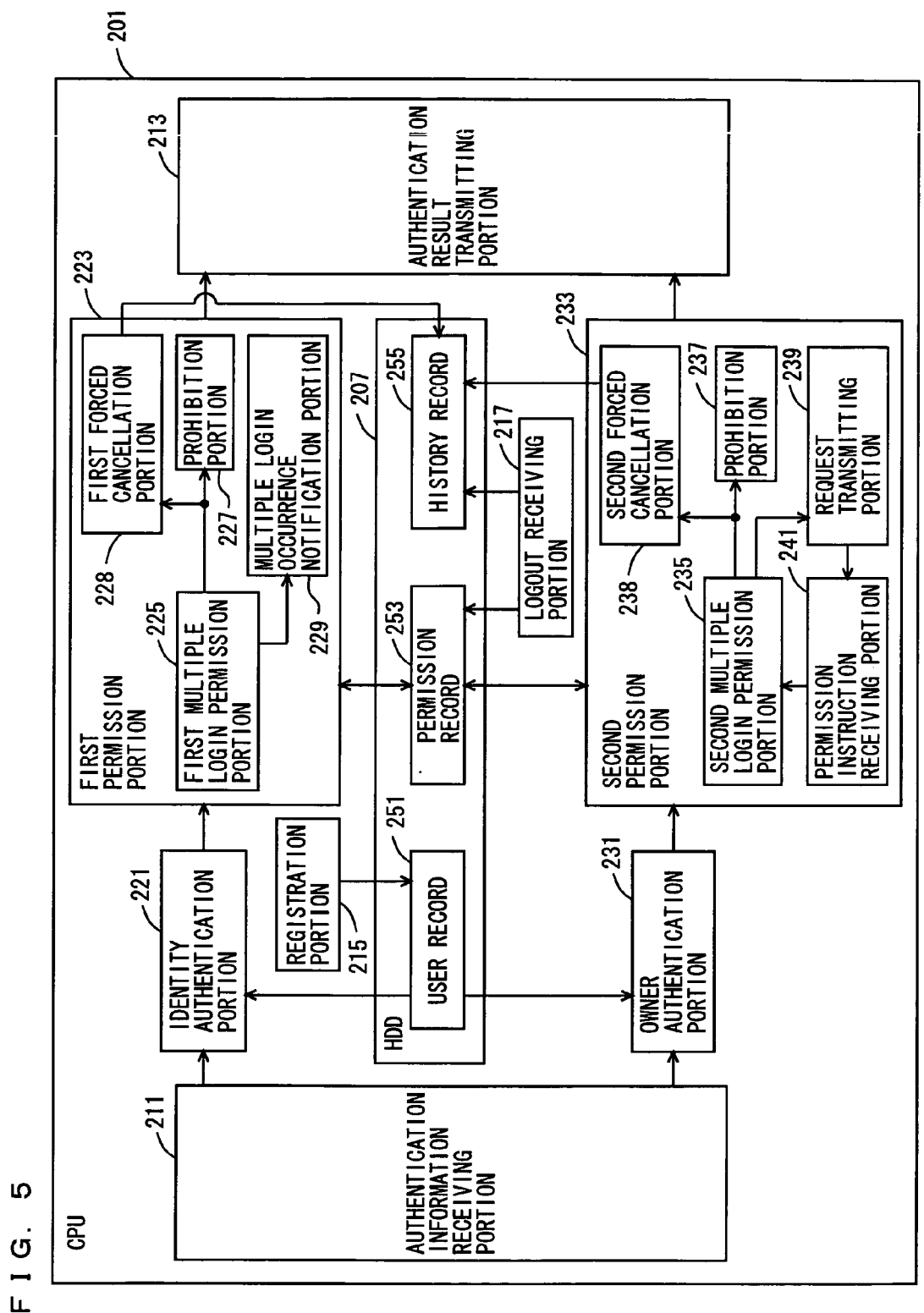
FIG. 5 is a functional block diagram showing an example of the function of a CPU provided in the authentication server together with data stored in an HDD.

FIG. 5 is a functional block diagram showing an example of the function of CPU 201 provided in authentication server 200, together with data stored in HDD 207. Referring to FIG. 5, CPU 201 provided in authentication server 200 includes: a registration portion 215 for registration of a user as a target of authentication; an authentication information receiving portion 211 to receive authentication information from one of MFPs 100, 100A, 100B, and 100C; an identity authentication portion 221 to perform authentication based on identity authentication information included in the authentication information; a first permission portion 223 to permit login based on an authentication result by identity authentication portion 221; an owner authentication portion 231 to perform authentication based on owner authentication information included in the authentication information; a second permission portion 233 to permit login based on an authentication result by owner authentication portion 231; an authentication result transmitting portion 213 to transmit an authentication result to the MFP that transmitted the authentication information; and a logout receiving portion 217 to cancel a permitted login.

For registration of a user as a target of authentication, registration portion 215 stores a user record corresponding to the user in HDD 207. Registration portion 215 accepts owner authentication information stored in an IC card issued to and owned by the user, or a fingerprint image that is the user's identity authentication information, and generates and stores in HDD 207 a user record including the owner authentication information and the fingerprint image. Accordingly, user record 251 is stored in HDD 207.

When the user inputs the owner authentication information stored in the IC card to input portion 204, registration portion 215 receives the owner authentication information from input portion 204, whereas when the user causes fingerprint reader 208 to read the fingerprint, registration portion 215 receives the fingerprint image from fingerprint reader 208. When the user inputs restriction information to input portion 204, registration portion 215 receives the restriction information from input portion 204. The restriction information refers to the information for restricting the processing that can be executed by the MFP the user is about to operate, i.e., MFP 100 in this example. The restriction information includes restriction information associated with login based on the fingerprint image and restriction information associated with login using the IC card. The two kinds of restriction information are input in order to differentiate the processing executable by MFP 100 depending on the manners of authentication. It is preferable that the processing is less restricted in the case of authentication with the identity authentication information than in the case of authentication with the owner authentication information, since the authentication using the identity authentication information is safer than the authentication using the owner authentication information. It may also be configured such that the processing is restricted by the restriction information only in the case of authentication using the owner authentication information, with no restriction imposed on the processing by the restriction information in the case of authentication using the identity authentication information. When registration portion 215 registers a plurality of users, a plurality of user records 251 corresponding to the respective users are stored in HDD 207.

Registration portion 215 stores the user record in HDD 207 on the condition that an administrator of authentication server 200 is authenticated. This is for the purpose of registering only the users authenticated by the administrator. For example, when authentication server 200 is used, login is requested, and the user record is stored in HDD 207 only in the case where the login is allowed. Alternatively, it may be configured such that user record 251 is stored on the condition that a predetermined password is input. In this case, registration can be made only by the user as a target of registration, even if the administrator has not logged in. The user records are stored for the users who know the password, which makes it possible to register only the specific users.

While the case of inputting a fingerprint image from fingerprint reader 208 has been described above, alternatively, a fingerprint image that was obtained when the user caused another fingerprint reader to read his/her fingerprint may be received from another computer, or still alternatively, a fingerprint image stored in a recording medium such as a semiconductor memory may be read out. In these cases, the user to be registered does not need to operate the authentication server, because the administrator alone can register the user.

FIG. 6 shows an example of the format of the user record. Referring to FIG. 6, the user record includes the fields of record No., identity authentication information, owner authentication information, first restriction information, and second restriction information. The field of record No. includes the number for identification of the user record, which is automatically numbered by registration portion 215. The field of owner authentication information includes the information for identification of a possession of the user, which is herein the owner authentication information stored in the IC card (possession) issued to the user. As the owner authentication information, a value input by the user via operating portion 115 is set. The field of identity authentication information includes the information for identification of the user him/herself. Herein, the identity authentication information is the fingerprint image read from the user's fingerprint. As the identity authentication information, the fingerprint image output from fingerprint reader 208 that was caused by the user to read the fingerprint, is set. While the fingerprint, one of the biometric information, is herein explained as an example of the identity authentication information, other biometric information, such as iris, vein pattern or the like, may also be used. Although the user record may include the fingerprint image itself, alternatively, it may include a file name for identification of the data file of the fingerprint image, or may include a pointer to the data file.

The first restriction information is the information for restricting executable processing in the case where login is permitted based on the identity authentication information (fingerprint image), and a value input from the user via operating portion 115 is set therefor. The second restriction information is the information for restricting executable processing in the case where login is permitted based on the owner authentication information, and a value input from the user via operating portion 115 is set therefor.

Returning to FIG. 5, authentication information receiving portion 211 receives authentication information from one of MFPs 100, 100A, 100B, and 100C. The authentication information is either the fingerprint image as the identity authentication information, or the owner authentication information. When communication I/F 202 receives authentication information from one of MFPs 100, 100A, 100B, and 100C, authentication information receiving portion 211 receives the authentication information from communication I/F 202. Here, provided that the authentication information has been received from MFP 100, the authentication information is either the fingerprint image, which was obtained by reading the fingerprint of the user who is trying to log in MFP 100, or the owner authentication information stored in the IC card issued to the user. If the authentication information is the fingerprint image, authentication information receiving portion 211 outputs the fingerprint image to identity authentication portion 221, whereas if the authentication information is the owner authentication information, it outputs the owner authentication information to owner authentication portion 231.

Further, authentication information receiving portion 211 acquires an apparatus ID (apparatus identification information) for identification of MFP 100 that transmitted the authentication information. This is for identifying the apparatus for which login is permitted, and for returning an authentication result, as will be described later. Herein, as the apparatus ID, the position information on network 2 assigned to MFP 100 is acquired, which may be, for example, an IP (Internet Protocol) address or a MAC (Media Access Control)

address. Authentication information receiving portion 211 outputs the apparatus ID to first permission portion 223 and authentication result transmitting portion 213.

Identity authentication portion 221 compares the input fingerprint image with the fingerprint image in the field of identity authentication information of user record 251 stored in HDD 207. Comparison is made for every user record 251 stored in HDD 207. As a result of comparison, if a user record having the matching fingerprint image is stored in HDD 207, identity authentication portion 221 authenticates it and outputs a success signal to first permission portion 223. If there is no user record having the matching fingerprint image, it outputs a failure signal to first permission portion 223. Herein, it is determined that there is a match between the fingerprint images not only in the case where they match completely but also in the case where they are similar enough to be determined to be of a same person. The success signal includes the record No. of user record 251 that includes the fingerprint image matching the input fingerprint image, and the apparatus ID of the MFP that transmitted the fingerprint image.

Owner authentication portion 231 compares the owner authentication information input from authentication information receiving portion 211 with the owner authentication information set in the field of owner authentication information of user record 251 stored in HDD 207. Comparison is made for every user record 251 stored in HDD 207. As a result of comparison, if a user record having the matching information is stored in HDD 207, owner authentication portion 231 authenticates it and outputs a success signal to second permission portion 233, whereas if there is no such user record, it outputs a failure signal to second permission portion 233. The success signal includes the record No. of user record 251 that includes the owner authentication information matching the input owner authentication information, and the apparatus ID of the MFP that transmitted the owner authentication information.

First permission portion 223 generates a permission record when a success signal is input from identity authentication portion 221, and stores it in HDD 207. Second permission portion 233 generates a permission record when a success signal is input from owner authentication portion 231, and stores it in HDD 207. The permission record will now be described.

FIG. 7 shows an example of the format of the permission record. Referring to FIG. 7, the permission record includes the fields of record No., identity authentication, apparatus information 1, login date and time 1, owner authentication, apparatus information 2, and login date and time 2. The field of record No. shows the record No. of the user record, in which the record No. included in the success signal output from identity authentication portion 221 or owner authentication portion 231 is set. In other words, it is the record No. assigned to the user record that includes the fingerprint image or the owner authentication information matching the fingerprint image or the owner authentication information included in the authentication information. The fields of identity authentication and owner authentication indicate whether the login is permitted based on the fingerprint image or the owner authentication information. In the case where first permission portion 223 permits the login, the field of identity authentication is set to "ON", while in the case where second permission portion 233 permits the login, the field of owner authentication is set to "ON". The fields of apparatus information 1 and 2 indicate the apparatus ID of the apparatus that transmitted the authentication information. In the case where first permission portion 223 permits the login, the apparatus ID of the apparatus that transmitted the fingerprint image is set in the field of apparatus information 1, while in the case where second permission portion 233 permits the login, the apparatus ID of the apparatus that transmitted the owner authentication information is set in the field of apparatus information 2. The fields of login date and time 1 and 2 indicate the date and time when login was permitted. In the case where first permission portion 223 permits the login, the date and time at that time is set in the field of login date and time 1, while in the case where second permission portion 233 permits the login, the data and time at that time is set in the field of login date and time 2.

Returning to FIG. 5, first permission portion 223 includes a first multiple login permission portion 225, a multiple login occurrence notification portion 229, a prohibition portion 227, and a first forced cancellation portion 228. First multiple login permission portion 225 extracts, from among permission records 253 stored in HDD 207, the permission record that includes the record No. included in the success signal input from identity authentication portion 221.

If the permission record including the record No. included in the success signal input from identity authentication portion 221 is not stored in HDD 207, first multiple login permission portion 225 transmits a permission signal to authentication result transmitting portion 213 to permit login based on the fingerprint image. The permission signal includes the first restriction information that is set in the user record having the record No. included in the success signal input from identity authentication portion 221. Further, first multiple login permission portion 225 generates and stores a permission record in HDD 207. Accordingly, permission record 253 is stored in HDD 207. At this time, in the field of record No. of the permission record, the record No. included in the success signal input from identity authentication portion 221 is set. Further, the field of identity authentication is set to "ON", the apparatus ID included in the success signal input from identity authentication portion 221 is set in the field of apparatus information 1, the date and time at that time is set in the field of login date and time 1, and the field of owner authentication is set to "OFF".

When permission record 253 is extracted, first multiple login permission portion 225 refers to the values set in the respective fields of identity authentication and owner authentication of the relevant permission record. If the field of identity authentication is set to "ON", first multiple login permission portion 225 outputs a multiple login error signal to first forced cancellation portion 228 and prohibition portion 227. This is because, if the field of identity authentication is set to "ON", it means that login has already been permitted based on the same fingerprint image. Since it is not clear which image is authentic, the fingerprint image with which the login was previously permitted, or the fingerprint image received this time, it is configured not to permit both logins. Accordingly, it instructs prohibition portion 227 not to permit login based on the fingerprint image received this time, and it also instructs first forced cancellation portion 228 to forcibly cancel the already permitted login.

Prohibition portion 227, in receipt of the multiple login error signal from first multiple login permission portion 225, outputs a non-permission signal to authentication result transmitting portion 213.

First forced cancellation portion 228 sets the field of identity authentication of permission record 253 extracted by first multiple login permission portion 225 to "OFF", and transmits a forced logout signal to the apparatus identified by the apparatus ID set in the field of apparatus information 1 of permission record 253. In the apparatus that received the forced logout signal, the login permitted to that point is cancelled. This can prevent prolongation of the undesirable state that login is permitted to the person whose authenticity is not clear in the apparatus.

If the field of identity authentication of the extracted permission record is set to "OFF", first multiple login permission portion 225 permits the login. Specifically, it outputs a permission signal to authentication result transmitting portion 213, and updates permission record 253. Permission record 253 to be updated by first multiple login permission portion 225 is the one including the record No. included in the success signal input from identity authentication portion 221. The field of identity authentication of the permission record is set to "ON", the apparatus ID included in the success signal input from identity authentication portion 221 is set in the field of apparatus information 1, and the date and time at that time is set in the field of login date and time 1.

Further, first multiple login permission portion 225 determines whether the field of owner authentication of the extracted permission record 253 is set to "ON". If so, first multiple login permission portion 225 outputs a multiple login signal to multiple login occurrence notification portion 229. This is because, if the field of owner authentication of permission record 253 is set to "ON", it means that login has already been permitted based on the owner authentication information. The multiple login signal is output for the purpose of notifying the user for whom login has already been permitted of the event that login has also been permitted based on the fingerprint image. The multiple login signal includes the apparatus IDs set for the respective fields of apparatus information 1 and 2 of permission record 253. If the field of owner authentication of permission record 253 is not set to "ON", first multiple login permission portion 225 does not output a multiple login signal to multiple login occurrence notification portion 229.

When a multiple login signal is input from first multiple login permission portion 225, multiple login occurrence notification portion 229 transmits multiple login occurrence information to the apparatus identified by the apparatus ID set in the field of apparatus information 2, for notification of occurrence of multiple logins. The multiple login occurrence information includes the apparatus ID set in the field of apparatus information 1 of permission record 253, and a message indicating that multiple logins have occurred. Specifically, it causes communication I/F 202 to transmit the multiple login occurrence information to the apparatus identified by the apparatus ID. For example, in the case where a user A has previously logged in MFP 100A with the IC card of another user B, and user B has now logged in MFP 100B with the fingerprint image, then the multiple login occurrence information is transmitted to MFP 100A. On display portion 114 of MFP 100A, the apparatus name of MFP 100B and the message indicating occurrence of multiple logins are displayed. In this manner, it is possible to notify user A of MFP 100A that user B has logged in MFP 100B with the fingerprint image.

Second permission portion 233 includes a second multiple login permission portion 235, a prohibition portion 237, a request transmitting portion 239, a permission instruction receiving portion 241, and a second forced cancellation portion 238. Second multiple login permission portion 235 extracts, from among permission records 253 stored in HDD 207, a permission record that includes the record No. included in the success signal input from owner authentication portion 231. If the permission record including the record No. included in the success signal input from owner authentication portion 231 is not stored in HDD 207, second multiple login permission portion 235 transmits a permission signal to authentication result transmitting portion 213 to permit login based on the owner authentication information. The permission signal includes the second restriction information set in the user record having the record No. included in the success signal input from owner authentication portion 231.

Second multiple login permission portion 235 generates and stores a permission record in HDD 207. Accordingly, permission record 253 is stored in HDD 207. In the permission record, the record No. included in the success signal input from owner authentication portion 231 is set in the field of record No., the field of owner authentication is set to "ON", the apparatus ID included in the success signal input from owner authentication portion 231 is set in the field of apparatus information 2, the date and time at that time is set in the field of login date and time 2, and the field of identity authentication is set to "OFF".

When permission record 253 is extracted, second multiple login permission portion 235 refers to the values set in the respective fields of identity authentication and owner authentication of the relevant permission record. When the field of owner authentication is set to "ON", second multiple login permission portion 235 outputs a multiple login error signal to second forced cancellation portion 238 and prohibition portion 237. This is because, when the field of owner authentication is set to "ON", it means that login has already been permitted based on the same owner authentication information. Since it is unclear which information is authentic, the owner authentication information with which login has previously been permitted or the owner authentication information received this time, it is configured not to permit both logins. Thus, it instructs prohibition portion 237 not to permit login based on the owner authentication information received this time, and it also instructs second forced cancellation portion 238 to forcibly cancel the already permitted login.

In receipt of the multiple login error signal from second multiple login permission portion 235, prohibition portion 237 outputs a non-permission signal to authentication result transmitting portion 213. Second forced cancellation portion 238 sets the field of owner authentication in permission record 253 extracted by second multiple login permission portion 235 to "OFF", and transmits a forced logout signal to the apparatus identified by the apparatus ID set in the field of apparatus information 2 of permission record 253. In the apparatus that received the forced logout signal, the login permitted to that point is cancelled. This can prevent prolongation of the undesirable state that login is permitted to the person whose authenticity is not clear in the apparatus.

When the field of owner authentication of the extracted permission record is set to "OFF", second multiple login permission portion 235 instructs request transmitting portion 239 to transmit a request signal. This instruction includes the apparatus IDs set for the respective fields of apparatus information 1 and 2 in permission record 253. That the field of owner authentication is set to "OFF" means that the field of identity authentication is set to "ON", because permission record 253 should be deleted at the time of logout by logout receiving portion 217, which will be described later. When the field of identity authentication of permission record 253 is set to "ON", login has previously been permitted based on the fingerprint image, and thus, the request signal is transmitted in order to notify the user for whom login has already been permitted that login is being requested based on the owner authentication information, and to request permission of login.

Request transmitting portion 239, when instructed by second multiple login permission portion 235 to transmit a request signal, transmits the request signal to the apparatus identified by the apparatus ID set in the field of apparatus information 1. The request signal includes the apparatus ID set in the field of apparatus information 2 of permission record 253 and a message requesting permission of multiple logins. Specifically, request transmitting portion 239 causes communication I/F 202 to transmit the request signal to the apparatus identified by the apparatus ID. For example, in the case where a user A has already logged in MFP 100A with the fingerprint image, and another user B is trying to log in MFP 100B using the IC card of user A, then the request signal is transmitted to MFP 100A. On display portion 114 of MFP 100A, the apparatus name of MFP 100B and the message requesting permission of multiple logins are displayed. In this manner, it is possible to notify user A of MFP 100A that user B having the IC card is trying to log in MFP 100B. When user A saw the message displayed according to the request signal and inputs a permission instruction to MFP 100A, the permission instruction is transmitted to authentication server 200.

Permission instruction receiving portion 241 receives the permission instruction transmitted from MFP 100A. Specifically, the permission instruction received from MFP 100A via communication I/F 202 is input. If user A does not input the permission instruction, permission instruction receiving portion 241 would not receive the permission instruction. Upon reception of the permission instruction, permission instruction receiving portion 241 instructs second multiple login permission portion 235 to output a permission signal.

Second multiple login permission portion 235 permits login based on the owner authentication information on the condition that the instruction to output the permission signal is input from permission instruction receiving portion 241. Specifically, it outputs the permission signal to authentication result transmitting portion 213, and also updates permission record 253. The permission signal includes the second restriction information that is set in the user record having the record No. included in the success signal input from owner authentication portion 231. Permission record 253 to be updated by second multiple login permission portion 235 is the one including the record No. included in the success signal input from owner authentication portion 231. Second multiple login permission portion 235 sets the field of owner authentication of the permission record to "ON", sets the apparatus ID included in the success signal input from owner authentication portion 231 in the field of apparatus information 2, and sets the date and time at that time in the field of login date and time 2.

Authentication result transmitting portion 213 receives a permission instruction from first permission portion 223 or second permission portion 233, and receives the apparatus ID of the apparatus that transmitted the authentication information from authentication information receiving portion 211. The permission instruction includes the first or second restriction information included in the user record. In receipt of the permission instruction, authentication result transmitting portion 213 transmits an authentication result indicating permission of login to the apparatus identified by the apparatus ID input from authentication information receiving portion 211. The authentication result includes the first or second restriction information included in the permission instruction. That is, when the permission instruction is input from first permission portion 223, the authentication result includes the first restriction information, whereas when the permission instruction is input from second permission portion 233, the authentication result includes the second restriction information.

Logout receiving portion 217 receives a logout notification from one of MFPs 100, 100A, 100B, and 100C. Logout receiving portion 217 specifies one of permission records 253 stored in HDD 207 that includes the apparatus ID of the apparatus that transmitted the logout notification. If the apparatus ID of the apparatus that transmitted the logout notification is set in the field of apparatus information 1 of the specified permission record, it sets the field of identity authentication to "OFF", whereas if the apparatus ID is set in the field of apparatus information 2, it sets the field of owner authentication to "OFF". Thereafter, if the fields of identity authentication and owner authentication are both "OFF", it deletes the relevant permission record from the HDD. Further, logout receiving portion 217 generates and stores a history record in HDD 207.

Figure 8:
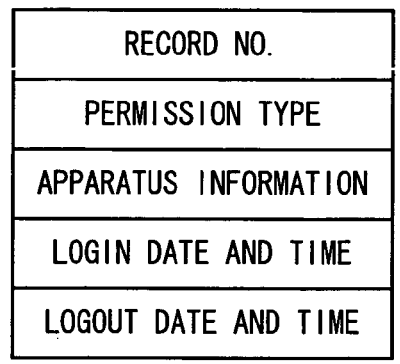
FIG. 8 shows an example of the format of a history record.

FIG. 8 shows an example of the format of the history record. Referring to FIG. 8, the history record includes the fields of record No., permission type, apparatus information, login date and time, and logout date and time. The field of record No. includes the record No. of the user record based on which the login was permitted. The field of permission type indicates whether the login was permitted based on the owner authentication information or the fingerprint image. The field of apparatus information indicates the apparatus ID of the apparatus for which the login was permitted. The field of login date and time indicates the date and time when the login was permitted, and the logout date and time indicates the date and time when the logout notification was received.

Returning to FIG. 5, logout receiving portion 217 sets the record No. set in the field of record No. of the previously specified permission record to the field of record No. of the history record. When the apparatus ID of the apparatus that transmitted the logout notification is set in the field of apparatus information 1 of the specified permission record, it sets the field of permission type of the history record to "identity authentication", whereas when the apparatus ID is set in the field of apparatus information 2, it sets the field of permission type of the history record to "owner authentication". Further, it sets the apparatus ID of the apparatus that transmitted the logout notification to the field of apparatus information of the history record. In the field of login date and time of the history record, the date and time set in login date and time 1 is set if the apparatus ID of the apparatus that transmitted the logout notification is set in the field of apparatus information 1 of the specified permission record, while the date and time set in login date and time 2 is set if the apparatus ID is set in the field of apparatus information 2. The current date and time is set in the field of logout date and time of the history record.

Figure 9:
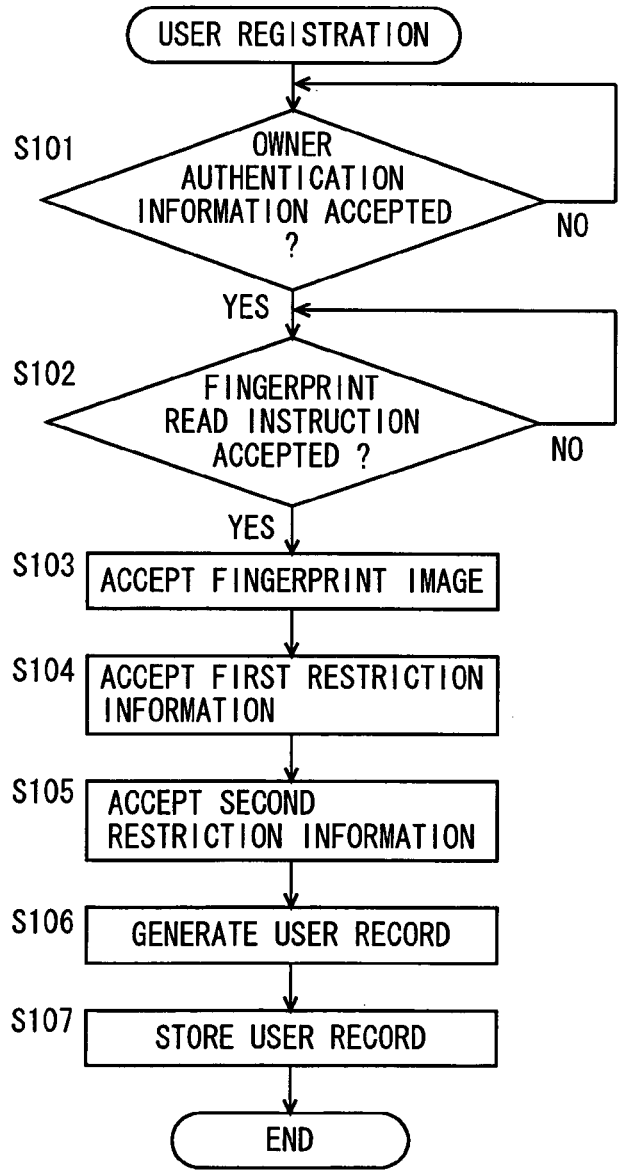
FIG. 9 is a flowchart illustrating an example of the flow of user registration processing.

FIG. 9 is a flowchart illustrating an example of the flow of user registration processing. The user registration processing is carried out by CPU 201 provided in authentication server 200 as CPU 201 executes an authentication program. Referring to FIG. 9, CPU 201 determines whether owner authentication information has been accepted (step S101). When the user inputs the owner authentication information stored in an IC card using a keyboard or the like of input portion 204, it accepts the owner authentication information from input portion 204. CPU 201 is in a standby mode until the owner authentication information is accepted (NO in step S101), and once the owner authentication information is accepted (YES in step S101), the process proceeds to step S102.

In step S102, it is determined whether a fingerprint read instruction to cause fingerprint reading has been accepted. Specifically, it is determined whether a predetermined key of the keyboard of input portion 204 has been depressed to cause fingerprint reader 208 to read the fingerprint. CPU 201 is in a standby mode until the fingerprint read instruction is accepted (NO in step S102), and once the fingerprint read instruction is accepted (YES in step S102), the process proceeds to step S103.

In step S103, the fingerprint image output from fingerprint reading portion 121 is accepted. The first restriction information is accepted (step S104), and the second restriction information is accepted (step S105). When the user inputs the first and second restriction information using the keyboard or the like of input portion 204, the first and second restriction information is accepted from input portion 204.

A user record is then generated (step S106). Specifically, a unique No. different from the record Nos. of the user records already stored in HDD 207 is set in the field of record No., the owner authentication information accepted in step S101 is set in the field of owner authentication information, the fingerprint image accepted in step S103 is set in the field of identity authentication information, the first restriction information accepted in step S104 is set in the field of first restriction information, and the second restriction information accepted in step S105 is set in the field of second restriction information.

In the following step S107, the generated user record is additionally stored in HDD 207, and the process is terminated.

FIG. 10 is a flowchart illustrating an example of the flow of authentication processing. The authentication processing is carried out by CPU 201 of authentication server 200 as CPU 201 executes the authentication program. Referring to FIG. 10, CPU 201 is in a standby mode until authentication information is received from one of MFPs 100, 100A, 100B, and 100C (NO in step S01), and once the authentication information is received (YES in step S01), the process proceeds to step S02. That is, the authentication processing is the processing that is carried out on the condition that the authentication information is received from one of MFPs 100, 100A, 100B, and 100C. It is noted that the authentication processing shown in FIG. 10 corresponds to a series of processing executed when one piece of authentication information is received. Thus, when a plurality of pieces of authentication information are received, the corresponding number of series of processing are executed in parallel for the received authentication information.

In step S02, it is determined whether the authentication information received in step S01 is identity authentication information (fingerprint image). If so, the process proceeds to step S03, whereas if it is not the identity authentication information but the owner authentication information, the process proceeds to step S04. In step S03, the identity authentication processing is carried out, and the process proceeds to step S05. In step S04, the owner authentication processing is carried out, and the process proceeds to step S05. The identity authentication processing and the owner authentication processing, which will be described later, are the steps of determining whether to permit the login.

In step S05, the result of the identity authentication processing or the owner authentication processing is determined. If the login is permitted, the process proceeds to step S06; otherwise, the process is terminated. In step S06, CPU 201 is in a standby mode until a logout notification is received, and once the logout notification is received, the process proceeds to step S07.

In step S07, permission record 253 stored in HDD 207 is updated. Specifically, permission record 253 including the apparatus ID of the apparatus that transmitted the logout notification is extracted from HDD 207, and if the apparatus ID of the apparatus is set in the field of apparatus information 1 of the permission record, the field of identity authentication is set to "OFF", while if the apparatus ID is set in the field of apparatus information 2, the field of owner authentication is set to "OFF". Further, when the both fields of identity authentication and owner authentication become "OFF", the permission record is deleted from HDD 207.

In the following step S08, a history record is generated and stored in HDD 207, and the process is terminated. Specifically, the record No. set in the field of record No. of the permission record specified in step S07 is set in the field of record No. of the history record, the apparatus ID of the apparatus that transmitted the logout notification is set in the field of apparatus information of the history record, and the current date and time is set in the field of logout date and time of the history record. Further, if the apparatus ID of the apparatus that transmitted the logout notification is set in the field of apparatus information 1 of the specified permission record, "identity authentication" is set in the field of permission type, and the date and time set in the field of login date and time 1 of the permission record is set in the field of login date and time of the history record. If the apparatus ID of the apparatus that transmitted the logout notification is set in the field of apparatus information 2 of the specified permission record, "owner authentication" is set in the field of permission type, and the date and time set in the field of login date and time 2 of the permission record is set in the field of login date and time of the history record.

FIG. 11 is a flowchart illustrating an example of the flow of identity authentication processing. The identity authentication processing is the processing executed in step S03 of FIG. 10. Referring to FIG. 11, it is determined whether a user record including the fingerprint image received in step S01 of FIG. 10 is stored in HDD 207 (step S11). If such a user record is stored, the relevant user record is extracted, and the process proceeds to step S12. Otherwise, the process proceeds to step S21.

In step S12, it is determined whether permission record 253 including the record No. of the user record extracted in step S11 is stored in HDD 207. If such permission record 253 is stored, the relevant permission record 253 is extracted, and the process proceeds to step S15. If there is no such permission record, the process proceeds to step S13.

In step S13, an authentication result indicating permission of login is transmitted to the apparatus that transmitted the authentication information. A permission record is generated and stored in HDD 207 (step S14). Specifically, CPU 201 sets the record No. of the user record extracted in step S11 in the field of record No. of the permission record, sets the field of identity authentication to "ON", sets the apparatus ID of the apparatus that transmitted the authentication information in the field of apparatus information 1, sets the date and time at that time in the field of login date and time 1, and sets the field of owner authentication to "OFF". In the following step S19, the return value is set to "permitted", and the process returns to the authentication processing.

The process proceeds to step S15 when permission record 253 is extracted in step S12. In this case, login has already been permitted based on the fingerprint image or the owner authentication information included in the user record previously extracted in step S11. Thus, in step S15, it is determined whether the previously permitted login is based on the identity authentication information or the owner authentication information. If the login is based on the identity authentication information, the process proceeds to step S20, while if the login is based on the owner authentication information, the process proceeds to step S16.

In step S16, an authentication result indicating permission of login is transmitted to the apparatus that transmitted the authentication information. The permission record is then updated (step S17). Specifically, the field of identity authentication of the permission record extracted in step S12 is set to "ON", the apparatus ID of the apparatus that transmitted the authentication information is set in the field of apparatus information 1, and the date and time at that time is set in the field of login date and time 1.

Then, occurrence of multiple logins is notified (step S18). Specifically, multiple login occurrence information is transmitted to the apparatus identified by the apparatus ID set in the field of apparatus information 2 of the permission record extracted in step S12. The multiple login occurrence information includes the apparatus ID of the apparatus that transmitted the authentication information, and a message indicating that multiple logins have occurred. In the following step S19, the return value is set to "permitted", and the process returns to the authentication processing.

Meanwhile, in step S20, a forced logout signal is transmitted. Specifically, the forced logout signal is transmitted to the apparatus that is identified by the apparatus ID set in the field of apparatus information 1 of the permission record extracted in step S12, since it is unclear which identity authentication information is authentic. The forced logout signal includes the identity authentication information included in the user record extracted in step S11, to specify the user who is to be forcibly logged out by the apparatus. At this time, the field of identity authentication of the permission record is set to "OFF".

In the following step S21, the authentication result indicating non-permission is transmitted to the apparatus that transmitted the authentication information. In the following step S22, the return value is set to "not permitted", and the process returns to the authentication processing.

Figure 12:
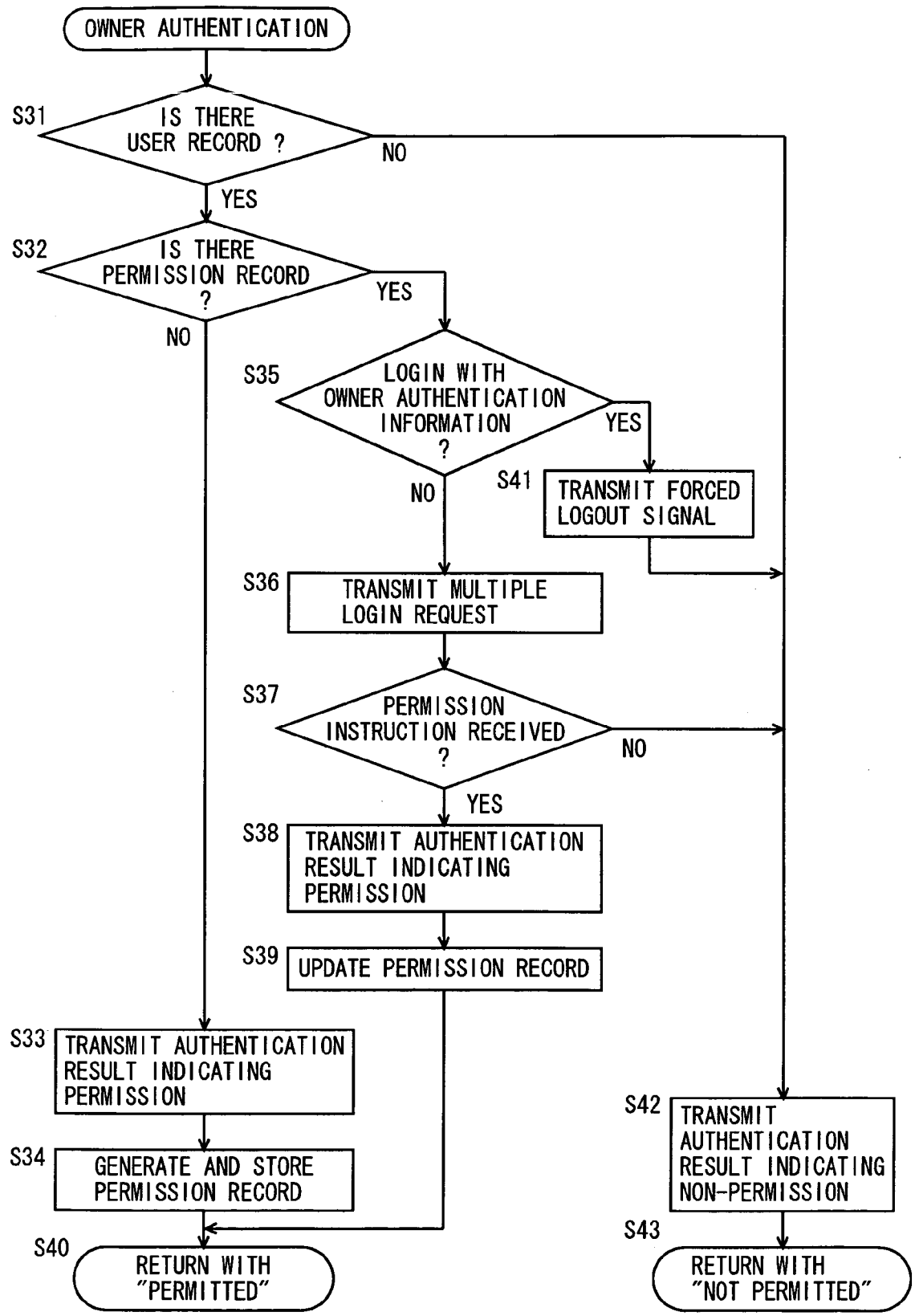
FIG. 12 is a flowchart illustrating an example of the flow of owner authentication processing.

FIG. 12 is a flowchart illustrating an example of the flow of owner authentication processing. The owner authentication processing is the processing executed in step S04 of FIG. 10. Referring to FIG. 12, the processing in steps S31 through S33 are identical to steps S11 through S13, respectively, of FIG. 11, and thus, description thereof will not be repeated here. In step S34, a permission record is generated and stored in HDD 207. Specifically, CPU 201 sets the record No. of the user record extracted in step S31 in the field of record No. of the permission record, sets the field of owner authentication to "ON", sets the apparatus ID of the apparatus that transmitted the authentication information in the field of apparatus information 2, sets the date and time at that time in the field of login date and time 2, and sets the field of identity authentication to "OFF". In the following step S40, the return value is set to "permitted", and the process returns to the authentication processing.

The process proceeds to step S35 when permission record 253 is extracted in step S32. In this case, login has already been permitted based on the identity authentication information or the owner authentication information included in the user record previously extracted in step S31. Thus, in step S35, it is determined whether the previously permitted login is based on the identity authentication information or the owner authentication information. If the login is based on the owner authentication information, the process proceeds to step S41, while if it is based on the identity authentication information, the process proceeds to step S36.

In step S36, a multiple login request is transmitted. The multiple login request is transmitted to the apparatus identified by the apparatus ID set in the field of apparatus information 1 of the permission record extracted in step S32. It is then determined whether a permission instruction has been received from the apparatus to which the multiple login request was transmitted (step S37). If the permission instruction is received, the process proceeds to step S38, while if the permission instruction is not received, the process proceeds to step S42. In step S38, an authentication result indicating permission of login is transmitted to the apparatus that transmitted the authentication information. The permission record is then updated (step S39). Specifically, the field of owner authentication of the permission record extracted in step S32 is set to "ON", the apparatus ID of the apparatus that transmitted the authentication information is set in the field of apparatus information 2, and the date and time at that time is set in the field of login date and time 2. In the following step S40, the return value is set to "permitted", and the process returns to the authentication processing.

Meanwhile, in step S41, a forced logout signal is transmitted. The forced logout signal is transmitted to the apparatus identified by the apparatus ID set in the field of apparatus information 2 of the permission record extracted in step S32, because it is unclear which owner authentication information is authentic. The forced logout signal includes the owner authentication information included in the user record extracted in step S31, to allow the apparatus to specify the user to be forcibly logged out. At this time, the field of owner authentication of the permission record is set to "OFF".

In the following step S42, an authentication result indicating non-permission is transmitted to the apparatus that transmitted the authentication information. In the following step S43, the return value is set to "not permitted", and the process returns to the authentication processing.

Figure 13:
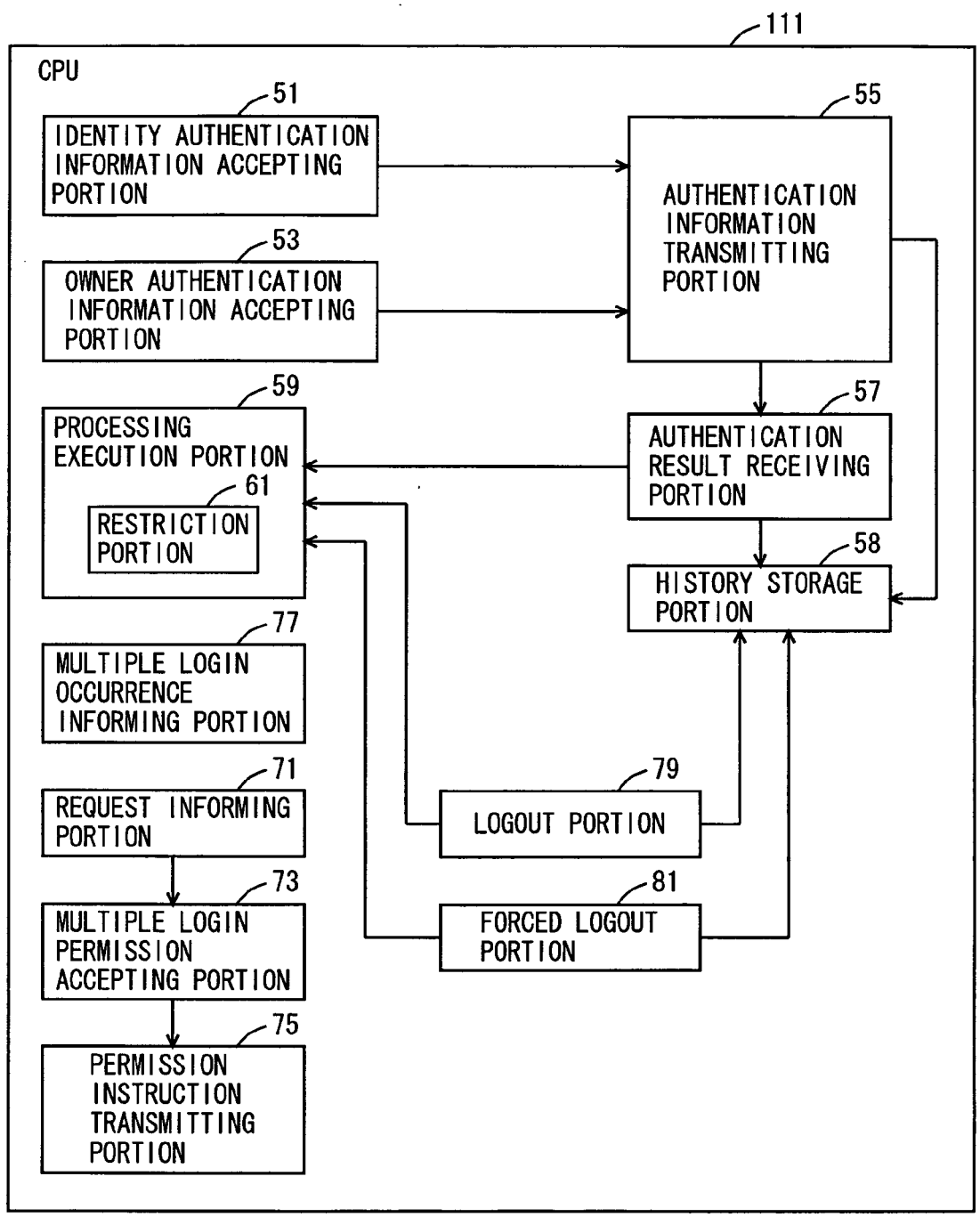
FIG. 13 is a functional block diagram schematically showing the function of a CPU provided in the MFP.

FIG. 13 is a functional block diagram schematically showing the function of CPU 111 of MFP 100. Referring to FIG. 13, CPU 111 of MFP 100 includes: an identity authentication information accepting portion 51 to accept a fingerprint image; an owner authentication information accepting portion 53 to accept owner authentication information; an authentication information transmitting portion 55 to transmit authentication information to authentication server 200; an authentication result receiving portion 57 to receive an authentication result from authentication server 200; a history storage portion 58 to store a history; a processing execution portion 59 to execute processing; a multiple login occurrence informing portion 77 to inform of occurrence of multiple logins; a request informing portion 71 to inform of a request for multiple logins; a multiple login permission accepting portion 73 to accept permission of multiple logins; a permission instruction transmitting portion 75 to transmit a permission instruction to authentication server 200; a logout portion 79 to cancel login; and a forced logout portion 81 to forcibly cancel login.

Identity authentication information accepting portion 51 accepts a fingerprint image of the user of MFP 100. Identity authentication information accepting portion 51 displays an authentication screen on display portion 114 to prompt fingerprint reading of the user. When fingerprint reading portion 121 reads the fingerprint, identity authentication information accepting portion 51 accepts the fingerprint image from fingerprint reading portion 121. Identity authentication information accepting portion 51 outputs the fingerprint image to authentication information transmitting portion 55.

Owner authentication information accepting portion 53 accepts owner authentication information stored in the IC card possessed by the user of MFP 100. Owner authentication information accepting portion 53 displays an authentication screen on display portion 114 to prompt the user to read the owner authentication information stored in the IC card possessed by the user. When card reader 122 receives the owner authentication information from the IC card, owner authentication information accepting portion 53 accepts the owner authentication information from card reader 122.

Figure 14:
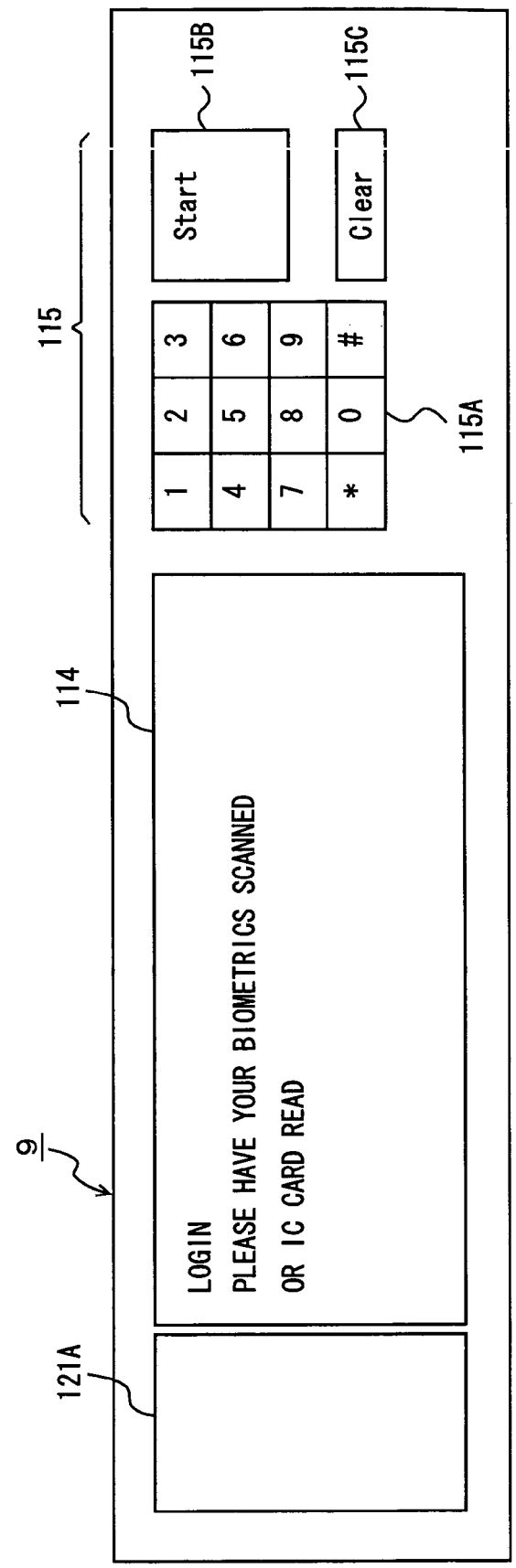
FIG. 14 is a plan view showing an example of an operation panel on which an authentication screen is displayed.

FIG. 14 is a plan view showing an example of the operation panel on which the authentication screen is displayed. Referring to FIG. 14, operation panel 9 includes display portion 114, operating portion 115, and a read surface 121A of fingerprint reading portion 121. Operating portion 115 includes a ten key pad 115A, a start key 115B to designate fingerprint reading, and a clear key 115C to cancel the input content. Display portion 114 displays the authentication screen. The authentication screen includes a message reading: "LOGIN—Please have your biometrics scanned or IC card read".

When the user depresses start key 1115B, fingerprint reading portion 121 is activated. When the user presses the ball of the finger onto read surface 121A of fingerprint reading portion 121, the fingerprint on the ball of the finger is read by fingerprint reading portion 121. When the user provides the IC card in the vicinity of read surface 121A, card reader 122 receives the owner authentication information stored in the IC card. Herein, card reader 122 is disposed on the back of read surface 121A.

Returning to FIG. 13, when the fingerprint image is input from identity authentication information accepting portion 51, authentication information transmitting portion 55 transmits the fingerprint image to authentication server 200 as the authentication information, and instructs authentication result receiving portion 57 to receive an authentication result. When the owner authentication information is input from owner authentication information accepting portion 53, authentication information transmitting portion 55 transmits the owner authentication information to authentication server 200 as the authentication information, and instructs authentication result receiving portion 57 to receive an authentication result.

Authentication result receiving portion 57 receives an authentication result from authentication server 200. The authentication result is either the authentication result indicating permission of login or the authentication result indicating non-permission of login, and includes the first or second restriction information. When the authentication result indicating permission of login is received, authentication result receiving portion 57 outputs the first or second restriction information to processing execution portion 59, and instructs processing execution portion 59 to execute the processing in accordance with an execution instruction to be input via operating portion 115. On the other hand, when the authentication result indicating non-permission of login is received, it instructs processing execution portion 59 not to execute the processing. Further, authentication result receiving portion 57 outputs the authentication result to history storage portion 58.

Processing execution portion 59 determines, in accordance with the instruction from authentication result receiving portion 57, whether to execute the processing according to the execution instruction that is to be input via operating portion 115 afterwards. When receiving the first or second restriction information, processing execution portion 59 restricts the range of the processing to be executed within the range restricted by the first or second restriction information. Specifically, when the first restriction information is input, it executes the processing within the range restricted by the first restriction information, while when the second restriction information is input, it executes the processing within the range restricted by the second restriction information.

Multiple login occurrence informing portion 77 receives multiple login occurrence information from authentication server 200. Specifically, the multiple login occurrence information received by data communication control portion 117 from authentication server 200 is input. The multiple login occurrence information includes the apparatus ID of the apparatus for which login has been permitted based on the fingerprint image, and a message indicating that multiple logins have occurred. Multiple login occurrence informing portion 77 displays on display portion 114 the apparatus ID of the apparatus in which multiple logins have occurred and the message indicating occurrence of the multiple logins. In this manner, it is possible to inform the user of MFP 100 that login has been permitted in another MFP based on the fingerprint image.

Request informing portion 71, in receipt of the request signal from authentication server 200, displays the apparatus name of the apparatus identified by the apparatus ID included in the request signal and a message requesting permission of multiple logins on display portion 114, to prompt an input of the instruction to permit or not to permit the multiple logins.

Multiple login permission accepting portion 73 accepts an instruction input by the user via operating portion 115. When accepting the instruction to permit the multiple logins, multiple login permission accepting portion 73 instructs permission instruction transmitting portion 75 to transmit a permission instruction. When accepting the instruction not to permit the multiple logins, it instructs permission instruction transmitting portion 75 to transmit a non-permission instruction. Permission instruction transmitting portion 75 transmits either the permission instruction or the non-permission instruction to authentication server 200 in accordance with the instruction input from multiple login permission accepting portion 73.

Logout portion 79 cancels login, outputs a logout signal to history storage portion 58, and transmits a logout notification to authentication server 200. Specifically, when a button to instruct logout provided in operating portion 115 is depressed, or when a predetermined period of time has passed after the login without accepting any execution instruction, it cancels the login permitted to that point. Specifically, it instructs processing execution portion 59 not to execute the processing according to an execution instruction to be input via operating portion 115.

Forced logout portion 81, in receipt of a forced logout signal from authentication server 200, cancels the login permitted to that point, outputs a logout signal to history storage portion 58, and transmits a logout notification to authentication server 200.

History storage portion 58, in receipt of an authentication result from authentication result receiving portion 57, generates and stores history data to HDD 116. The history data includes the fields of authentication information, authentication result, login date and time, logout date and time, and presence/absence of forced logout. The history data is generated to have the authentication information input from authentication information transmitting portion 55 set in the field of authentication information, the authentication result input from authentication result receiving portion 57 set in the field of authentication result, the date and time at that time set in the field of login date and time, and a space set in the field of logout date and time. Further, in receipt of a logout signal from logout portion 79, history storage portion 58 sets the date and time at that time in the field of logout date and time of the history data previously stored in HDD 116, and sets nothing in the field of presence/absence of forced logout. In receipt of a logout signal from forced logout portion 81, history storage portion 58 sets the date and time at that time in the field of logout date and time of the history data previously stored in HDD 116, and sets the field of presence/absence of forced logout to "ON".

Figure 15:
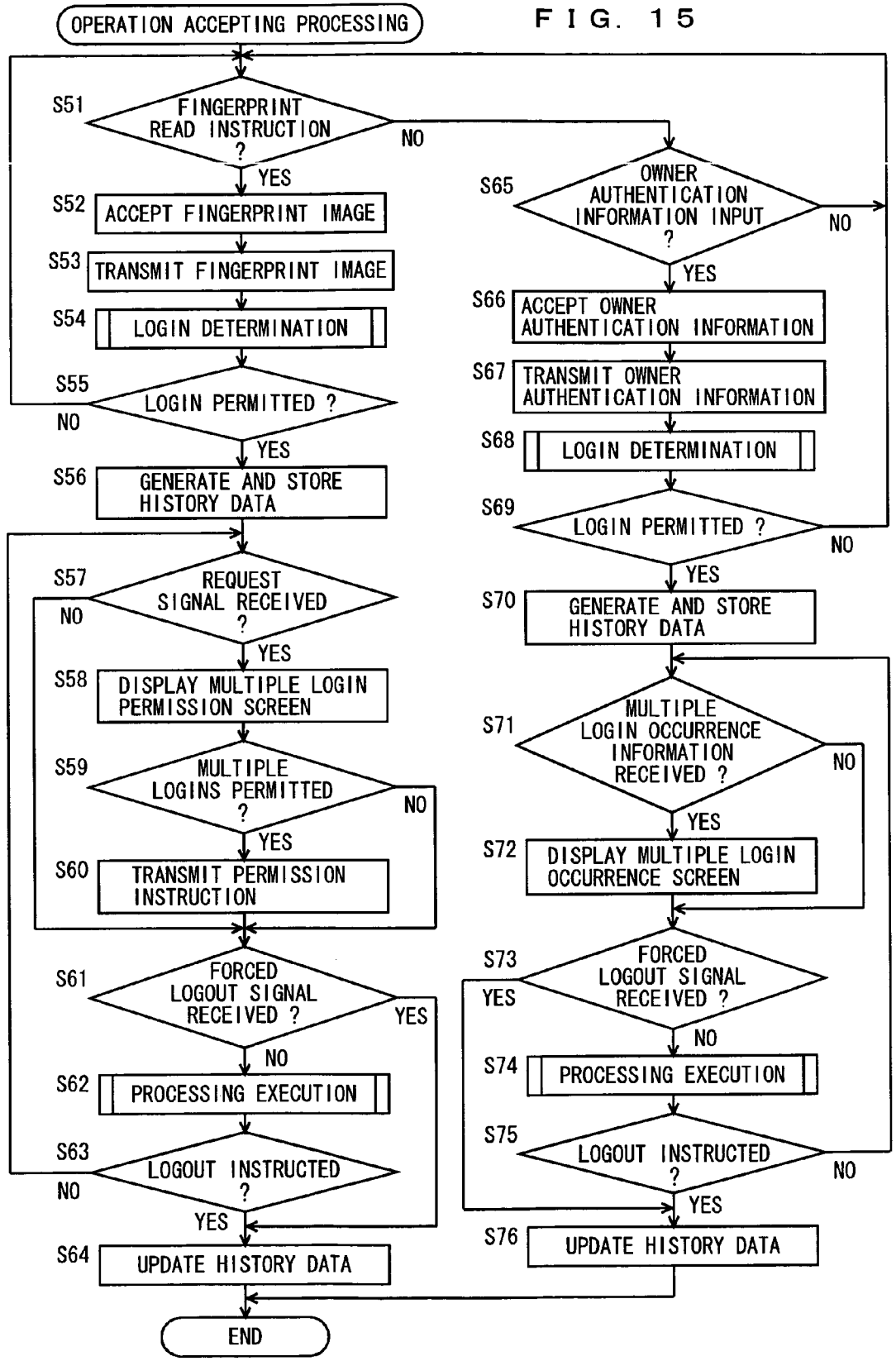
FIG. 15 is a flowchart illustrating an example of the flow of operation accepting processing.

FIG. 15 is a flowchart illustrating an example of the flow of operation accepting processing. The operation accepting processing is carried out by CPU 111 of MFP 100 as CPU 111 executes the program. Referring to FIG. 15, it is determined whether a fingerprint read instruction to cause fingerprint reading has been accepted (step S51). Specifically, it is determined whether start key 115B of operating portion 115 has been depressed to cause fingerprint reading portion 121 to read the fingerprint. If the fingerprint read instruction is accepted (YES in S51), the process proceeds to step S52; otherwise, the process proceeds to step S65.

In step S52, the fingerprint image output from fingerprint reading portion 121 is accepted. The fingerprint image is of the fingerprint of the user operating MFP 100. The fingerprint image is transmitted to authentication server 200 (step S53). CPU 111 then executes login determination processing (step S54). The login determination processing, which will be described later, is the processing for determination of the authentication result of authentication server 200.

If the login determination result indicates that login is permitted (YES in step S55), the process proceeds to step S56. If the login determination result indicates that login is not permitted, the process returns to step S51.

In step S56, history data is generated and stored in HDD 116. The history data is generated to have the fingerprint image accepted in step S52 set in the field of authentication information, the authentication result indicating that login is permitted set in the field of authentication result, the date and time at that time set in the field of login date and time, and a space set in the field of logout date and time.

In step S57, it is determined whether a request signal has been received from authentication server 200. If so, the process proceeds to step S58; otherwise, the process proceeds to step S61. In step S58, a multiple login permission screen is displayed on display portion 114. The multiple login permission screen includes the apparatus name of the apparatus identified by the apparatus ID included in the request signal, a message indicating that permission is requested for multiple logins, and a message prompting an input of the instruction to permit or not to permit the multiple logins. In this manner, it is possible to inform the user of MFP 100 that another person is trying to log in another MFP using the IC card.

It is then determined whether an instruction to permit the multiple logins has been accepted (step S59). If such an instruction has been accepted, the process proceeds to step S60; otherwise, the process proceeds to step S61. In step S60, a permission instruction is transmitted to authentication server 200. Next, it is determined whether a forced logout signal has been received from authentication server 200 (step S61). If so, the process proceeds to step S64; otherwise, the process proceeds to step S62. This is for the purpose of causing the person whose authenticity is not clear to log out by canceling the login.

In step S62, the processing execution processing is carried out, and the process proceeds to step S63. The processing execution processing, which will be described later, is the processing to execute processing according to an execution instruction input via operating portion 115. It is then determined whether an instruction to log out has been accepted. Specifically, it is determined whether the button to instruct logout provided in operating portion 115 has been depressed, or whether a predetermined period of time has passed since the login was permitted in step S54. When such an instruction to log out is accepted, the process proceeds to step S64; otherwise, the process returns to step S57.

In step S64, the history data stored in HDD 116 in step S56 is updated, and the process is terminated. When the process proceeds from step S63, the current date and time is set in the field of logout date and time of the history data. When the process proceeds from step S61, the date and time at that time is set in the field of logout date and time, and the field of presence/absence of forced logout of the history data is set to "ON".

Meanwhile, in step S65, it is determined whether owner authentication information has been input. It is determined whether the information has been received from the IC card by card reader 122. If the owner authentication information has been input, the process proceeds to step S66; otherwise, the process returns to step S51. In step S66, the owner authentication information is accepted from card reader 122, and the process proceeds to step S67. The owner authentication information is the one stored in the IC card possessed by the user who operates MFP 100.

The owner authentication information is transmitted to authentication server 200 (step S67). Next, the login determination processing is carried out similarly in step S54 (step S68). If the login determination result indicates that login is permitted (YES in step S69), the process proceeds to step S70. If the login determination result indicates that login is not permitted, the process returns to step S51.

In step S70, history data is generated and stored in HDD 116. The history data is generated by setting the owner authentication information accepted in step S65 in the field of authentication information, setting the authentication result indicating that login is permitted in the field of authentication result, setting the date and time at that time in the field of login date and time, and setting a space in the field of logout date and time.

In step S71, it is determined whether information indicating occurrence of multiple logins has been received from authentication server 200. If the multiple login occurrence information has been received, the process proceeds to step S72; otherwise, the process proceeds to step S73. In step S72, a multiple login occurrence screen is displayed on display portion 114. The multiple login occurrence screen includes the apparatus name of the apparatus for which login was permitted based on the fingerprint image, and a message indicating occurrence of multiple logins. In this manner, it is possible to inform the user of MFP 100 that login has been permitted in another MFP based on the fingerprint image.

In step S73, it is determined whether a forced logout signal has been received from authentication server 200. If the forced logout signal has been received, the process proceeds to step S76; otherwise, the process proceeds to step S74. This is for the purpose of causing the person whose authenticity is not clear to log out by canceling the login. Further, in receipt of the multiple login occurrence information, multiple login occurrence informing portion 77 outputs the apparatus ID included in the multiple login occurrence information to history storage portion 58.

In step S74, the processing execution processing is carried out, and the process proceeds to step S75. The processing execution processing, which will be described later, is the processing to execute processing according to an execution instruction input via operating portion 115. It is then determined whether an instruction to log out is accepted. If so, the process proceeds to step S76; otherwise, the process returns to step S71.

In step S76, the history data stored in HDD 116 in step S70 is updated, and the process is terminated. When the process proceeds from step S75, the current date and time is set in the field of logout date and time of the history data. When the process proceeds from step S73, the current date and time is set in the field of logout date and time of the history data, and also the field of presence/absence of forced logout of the history data is set to "ON".

Figure 16:
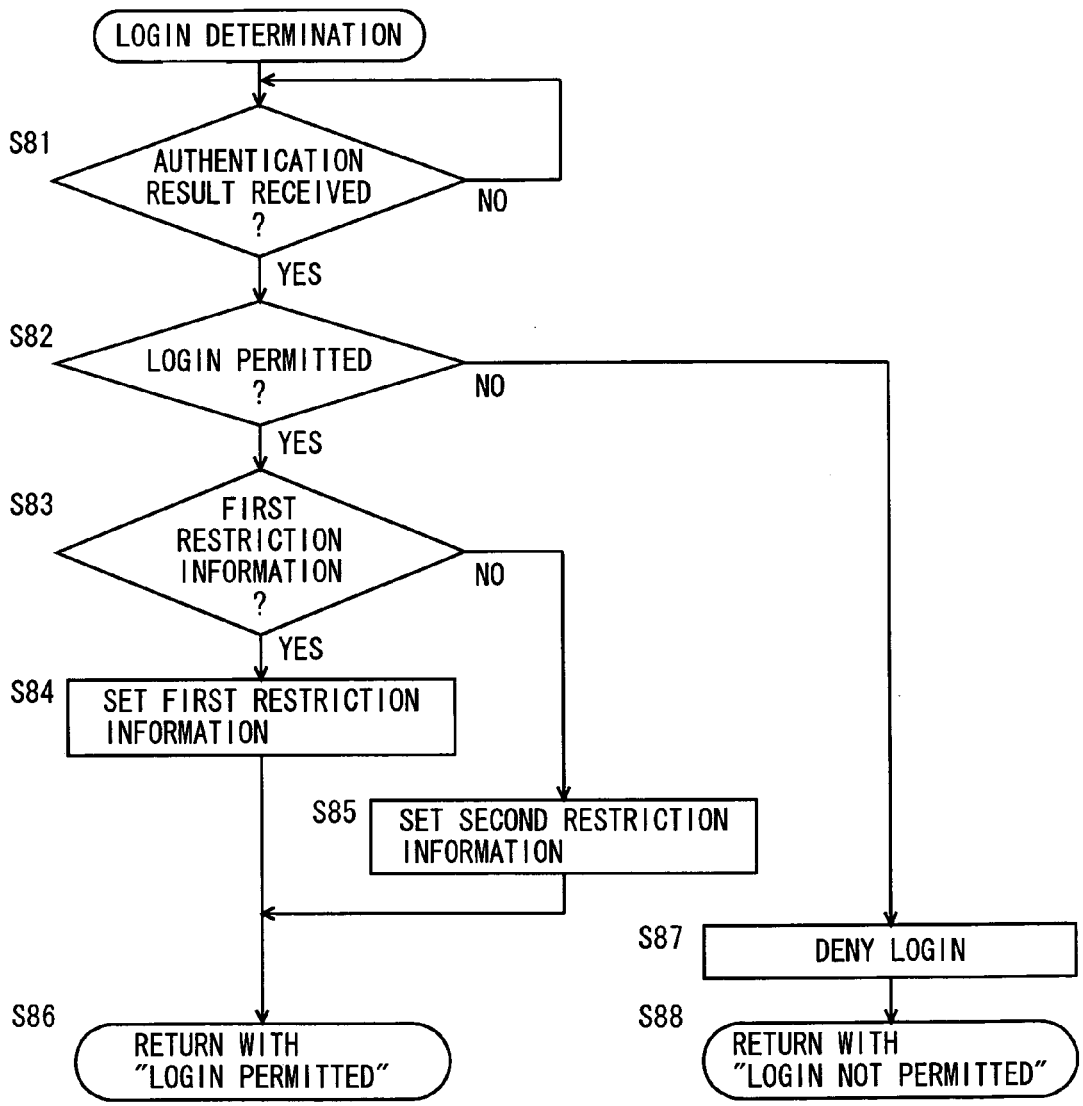
FIG. 16 is a flowchart illustrating an example of the flow of login determination processing.

FIG. 16 is a flowchart illustrating an example of the flow of login determination processing. The login determination processing is the processing executed in step S54 and step S68 in FIG. 15. Referring to FIG. 16, CPU 111 is in a standby mode until an authentication result is received from authentication server 200 (step S81), and once the authentication result is received, the process proceeds to step S82. It is determined whether the authentication result indicates permission of login (step S82). If the authentication result indicates permission of login, the process proceeds to step S83; otherwise, the process proceeds to step S87.

In step S83, if the authentication information includes the first restriction information (YES in step S83), the first restriction information is set (step S84), and the process proceeds to step S86. If the authentication information includes the second restriction information (NO in step S83), the second restriction information is set (step S85), and the process then proceeds to step S86. In step S86, the return value is set to "login permitted", and the process returns to the operation accepting processing. Meanwhile, in step S87, the login is denied, and the process proceeds to step S88. For example, an error message indicating that the login has been denied is displayed on display portion 114. In step S88, the return value is set to "login not permitted", and the process returns to the operation accepting processing.

FIG. 17 shows an example of the flow of processing execution processing. The processing execution processing is the processing executed in step S62 and step S74 in FIG. 15. Referring to FIG. 17, it is determined whether an execution instruction has been accepted (step S91). If the execution instruction has been accepted, the process proceeds to step S92, while if the execution instruction has not been accepted, the process returns to the operation accepting processing.

In step S92, it is determined whether the accepted execution instruction is within the range of the first or second restriction information set in the login determination processing. If it is within the range of the restriction having been set, the process proceeds to step S93; otherwise, the process proceeds to step S94. In step S93, the processing is carried out in accordance with the execution instruction accepted in step S91, and the process returns to the operation accepting processing. In step S94, error processing is executed, and the process returns to the operation accepting processing. In the error processing, for example, an error message indicating that the processing cannot be executed due to the restriction is displayed on display portion 114. In this manner, it is possible to differentiate the restriction information and, hence, the processing that can be executed by the operator, between the case where the login is permitted based on the fingerprint image and the case where the login is permitted based on the owner authentication information stored in the IC card. In other words, the user having the fingerprint image registered in the user record is able to cause MFP 100 to execute the processing that is different from the processing MFP 100 is caused to execute by the person who has been passed the IC card of the user and asked to work on his/her behalf. For example, while the user having the fingerprint image registered in the user record is capable of color printing, the person who has been passed the user's IC card and works on his/her behalf is restricted from printing in color, and is only allowed to print in monochrome.

While authentication system 1 has been described in the above embodiment, the present invention may of course be understood as an authentication method or an authentication program that causes a computer to execute the processing illustrated in FIGS. 9-13 and 15-17.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An authentication apparatus, comprising:
a storage portion to store a user record including identity authentication information for authentication of identity of a user, and owner authentication information assigned to a possession of the user;
an identity authentication portion to compare identity authentication information received from one of a plurality of information processing apparatuses with said identity authentication information included in said user record for authentication;
a first permission portion to transmit a permission signal permitting login based on said identity authentication information authenticated by said identity authentication portion to said one of said plurality of information processing apparatuses that transmitted said identity authentication information;
an owner authentication portion to compare owner authentication information received from one of said plurality of information processing apparatuses with said owner authentication information included in said user record for authentication; and
a second permission portion to transmit a permission signal permitting login based on said owner authentication information authenticated by said owner authentication portion to said one of said plurality of information processing apparatuses that transmitted said owner authentication information;
wherein said second permission portion includes a request transmitting portion to transmit, before permitting the login based on said received owner authentication information, a request for multiple logins to the information processing apparatus that permitted the previous login based on said identity authentication information, said identity authentication information being associated with said received owner authentication information by said user record, in a case where a user previously logged in using said identity authentication information continues to be logged in when one of the plurality of information processing apparatuses sends an authentication request based on said received owner authentication information, and
said second permission portion permits the login based on said received owner authentication information on the condition that a permission instruction is received from said information processing apparatus to which said request for multiple logins was transmitted.

2. The authentication apparatus according to claim 1, wherein
said storage portion stores the user record further including restriction information for restricting processing executable by respective ones of said plurality of information processing apparatuses, and said first permission portion and said second permission portion each transmit said restriction information together with said permission signal.

3. The authentication apparatus according to claim 1, wherein said first permission portion includes a first forced cancellation portion, when login has already been permitted based on said received identity authentication information, to transmit a logout instruction to the information processing apparatus that had previously transmitted said identity authentication information.

4. The authentication apparatus according to claim 1, wherein said second permission portion includes a second forced cancellation portion, when login has already been permitted based on said received owner authentication information, to transmit a logout instruction to the information processing apparatus that had previously transmitted said owner authentication information.

5. The authentication apparatus according to claim 1, further comprising a history storage portion to store a history of permission of login by one of said first permission portion and said second permission portion.

6. The authentication apparatus according to claim 1, wherein the identity authentication information is unique to a specific person; and
wherein the owner authentication information is physically transferrable from one person to another.

7. An authentication apparatus, comprising:
a storage portion to store a user record including identity authentication information for authentication of identity of a user, and owner authentication information assigned to a possession of the user;
an identity authentication portion to compare identity authentication information received from one of a plurality of information processing apparatuses with said identity authentication information included in said user record for authentication;
a first permission portion to transmit a permission signal permitting login based on said identity authentication information authenticated by said identity authentication portion to said one of said plurality of information processing apparatuses that transmitted said identity authentication information;
an owner authentication portion to compare owner authentication information received from one of said plurality of information processing apparatuses with said owner authentication information included in said user record for authentication; and
a second permission portion to transmit a permission signal permitting login based on said owner authentication information authenticated by said owner authentication portion to said one of said plurality of information processing apparatuses that transmitted said owner authentication information;
wherein said first permission portion includes a multiple login occurrence notification portion to notify, after permitting the login based on said received identity authentication information, of occurrence of multiple logins to the information processing apparatus that permitted the previous login based on said owner authentication, in a case where a user previously logged in using said owner authentication information continues to be logged in when one of the plurality of information processing apparatuses sends an authentication request based on said received identity authentication information, said owner authentication information being associated with said received identity authentication information by said user record.

8. The authentication apparatus according to claim 7, wherein
said storage portion stores the user record further including restriction information for restricting processing executable by respective ones of said plurality of information processing apparatuses, and
said first permission portion and said second permission portion each transmit said restriction information together with said permission signal.

9. The authentication apparatus according to claim 7, wherein said first permission portion includes a first forced cancellation portion, when login has already been permitted based on said received identity authentication information, to transmit a logout instruction to the information processing apparatus that had previously transmitted said identity authentication information.

10. The authentication apparatus according to claim 7, wherein said second permission portion includes a second forced cancellation portion, when login has already been permitted based on said received owner authentication information, to transmit a logout instruction to the information processing apparatus that had previously transmitted said owner authentication information.

11. The authentication apparatus according to claim 7, further comprising a history storage portion to store a history of permission of login by one of said first permission portion and said second permission portion.

12. An authentication system including a plurality of information processing apparatuses and an authentication apparatus,
said authentication apparatus comprising:
a communication portion to communicate with said plurality of information processing apparatuses;
a storage portion to store a user record including identity authentication information for authentication of identity of a user and owner authentication information for identification of the user;
an identity authentication portion to compare identity authentication information received from one of said plurality of information processing apparatuses with said identity authentication information included in said user record for authentication;
a first permission portion to transmit a permission signal permitting login based on said identity authentication information authenticated by said identity authentication portion to said one of said plurality of information processing apparatuses that transmitted said identity authentication information;
an owner authentication portion to compare owner authentication information received from one of said plurality of information processing apparatuses with said owner authentication information included in said user record for authentication; and
a second permission portion to transmit a permission signal permitting login based on said owner authentication information authenticated by said owner authentication portion to said one of said plurality of information processing apparatuses that transmitted said owner authentication information;
wherein said second permission portion includes a request transmitting portion to transmit, before permitting the login based on said received owner authentication information, a request for multiple logins to the information processing apparatus that permitted the previous login based on said identity authentication information, said identity authentication information being associated with said received owner authentication information by said user record, in a case where a user previously logged in using said identity authentication information continues to be logged in when one of the plurality of information processing apparatuses sends an authentication request based on said received owner authentication information, and each of said plurality of information processing apparatuses comprises a request informing portion to inform of said request for multiple logins in response to reception of said request for multiple logins.

13. The authentication system according to claim 12, wherein said storage portion of said authentication apparatus stores the user record further including restriction information for restricting processing executable by respective ones of said plurality of information processing apparatuses, said first permission portion and said second permission portion each transmit said restriction information together with said permission signal, and each of said plurality of information processing apparatuses comprises:

a processing execution portion capable of executing a plurality of types of processing; and a processing control portion to accept designation of one of said plurality of types of processing and cause said processing execution portion to execute said designated processing, said processing control portion including a restriction portion to restrict the types of said processing that can be designated, in accordance with said received restriction information.

14. The authentication system according to claim 12, wherein each of said plurality of information processing apparatuses comprises:

an identity authentication information accepting portion to accept identity authentication information;

an owner authentication information accepting portion to accept owner authentication information;

a transmitting portion to transmit one of said received identity authentication information and said received owner authentication information to said authentication apparatus;

a login permission portion to permit login based on one of said identity authentication information and said owner authentication information on the condition that said permission signal is received from said authentication apparatus; and a history storage portion to store a history of permission of login by said login permission portion.

15. The authentication system according to claim 12, wherein each of said plurality of information processing apparatuses further comprises:

a multiple login permission accepting portion to accept a permission instruction permitting multiple logins after said received request for multiple logins is informed; and a permission instruction transmitting portion, on the condition that said permission instruction is accepted, to transmit the permission instruction to said authentication apparatus; and said second permission portion of said authentication apparatus permits the login based on said input owner authentication information on the condition that said permission instruction is received in response to transmission of the request by said request transmitting portion.

16. An authentication system including a plurality of information processing apparatuses and an authentication apparatus, said authentication apparatus comprising:

a communication portion to communicate with said plurality of information processing apparatuses;

a storage portion to store a user record including identity authentication information for authentication of identity of a user and owner authentication information for identification of the user;

an identity authentication portion to compare identity authentication information received from one of said plurality of information processing apparatuses with said identity authentication information included in said user record for authentication;

a first permission portion to transmit a permission signal permitting login based on said identity authentication information authenticated by said identity authentication portion to said one of said plurality of information processing apparatuses that transmitted said identity authentication information;

an owner authentication portion to compare owner authentication information received from one of said plurality of information processing apparatuses with said owner authentication information included in said user record for authentication; and a second permission portion to transmit a permission signal permitting login based on said owner authentication information authenticated by said owner authentication portion to said one of said plurality of information processing apparatuses that transmitted said owner authentication information;

wherein said first permission portion includes a multiple login occurrence notification portion to notify, after permitting the login based on said received identity authentication information, of occurrence of multiple logins to the information processing apparatus that permitted the previous login based on said owner authentication information, in a case where a user previously logged in using said owner authentication information continues to be logged in when one of the plurality of information processing apparatuses sends an authentication request based on said received identity authentication information, said owner authentication information being associated with said received identity authentication information by said user record, and each of said plurality of information processing apparatuses comprises a multiple login occurrence informing portion to inform of occurrence of multiple logins in response to reception of the notification of occurrence of multiple logins.

17. The authentication system according to claim 16, wherein said storage portion of said authentication apparatus stores the user record further including restriction information for restricting processing executable by respective ones of said plurality of information processing apparatuses, said first permission portion and said second permission portion each transmit said restriction information together with said permission signal, and each of said plurality of information processing apparatuses comprises:

a processing execution portion capable of executing a plurality of types of processing; and a processing control portion to accept designation of one of said plurality of types of processing and cause said processing execution portion to execute said designated processing, said processing control portion including a restriction portion to restrict the types of said processing that can be designated, in accordance with said received restriction information.

18. The authentication system according to claim 16, wherein
each of said plurality of information processing apparatuses comprises:
an identity authentication information accepting portion to accept identity authentication information;
an owner authentication information accepting portion to accept owner authentication information;
a transmitting portion to transmit one of said received identity authentication information and said received owner authentication information to said authentication apparatus;
a login permission portion to permit login based on one of said identity authentication information and said owner authentication information on the condition that said permission signal is received from said authentication apparatus; and
a history storage portion to store a history of permission of login by said login permission portion.

19. An authentication method comprising:
a step of storing a user record including identity authentication information for authentication of identity of a user and owner authentication information for identification of the user;
an identity authentication step of comparing identity authentication information received from one of a plurality of information processing apparatuses with said identity authentication information included in said user record for authentication;
a first permission step of transmitting a permission signal permitting login based on said identity authentication information authenticated in said identity authentication step to said one of said plurality of information processing apparatuses that transmitted said identity authentication information;
an owner authentication step of comparing owner authentication information received from one of said plurality of information processing apparatuses with said owner authentication information included in said user record for authentication; and
a second permission step of transmitting a permission signal permitting login based on said owner authentication information authenticated in said owner authentication step to said one of said plurality of information processing apparatuses that transmitted said owner authentication information;
wherein said second permission step includes the steps of
transmitting, before permitting the login based on said received owner authentication information, a request for multiple logins to the information processing apparatus that permitted the previous login based on said identity authentication information, said identity authentication information being associated with said received owner authentication information by said user record, in a case where a user previously logged in using identity authentication information continues to be logged in when one of the plurality of information processing apparatuses sends an authentication request based on said received owner authentication information, and
permitting the login based on said received owner authentication information on the condition that a permission instruction is received from said information processing apparatus to which said request for multiple logins was transmitted.

20. The authentication method according to claim 19, wherein
said step of storing includes the step of storing the user record further including restriction information for restricting processing executable by respective ones of said plurality of information processing apparatuses, and
said first permission step and said second permission step each include the step of transmitting said restriction information together with said permission signal.

21. The authentication method according to claim 19, wherein said first permission step includes the step of, when login has already been permitted based on said received identity authentication information, transmitting a logout instruction to the information processing apparatus that had previously transmitted said identity authentication information.

22. The authentication method according to claim 19, wherein said second permission step includes the step of, when login has already been permitted based on said received owner authentication information, transmitting a logout instruction to the information processing apparatus that had previously transmitted said owner authentication information.

23. The authentication method according to claim 19, further comprising a step of storing a history of permission of login in one of said first permission step and said second permission step.

24. An authentication method comprising:
a step of storing a user record including identity authentication information for authentication of identity of a user and owner authentication information for identification of the user;
an identity authentication step of comparing identity authentication information received from one of a plurality of information processing apparatuses with said identity authentication information included in said user record for authentication;
a first permission step of transmitting a permission signal permitting login based on said identity authentication information authenticated in said identity authentication step to said one of said plurality of information processing apparatuses that transmitted said identity authentication information;
an owner authentication step of comparing owner authentication information received from one of said plurality of information processing apparatuses with said owner authentication information included in said user record for authentication; and
a second permission step of transmitting a permission signal permitting login based on said owner authentication information authenticated in said owner authentication step to said one of said plurality of information processing apparatuses that transmitted said owner authentication information;
wherein said first permission step includes the step of notifying, after permitting the login based on said received identity authentication information, of occurrence of multiple logins to the information processing apparatus that permitted the previous login based on said owner authentication information, in a case where a user previously logged in using said owner authentication information continues to be logged in when one of the plurality of information processing apparatuses sends an authentication request based on said received identity authentication information, said owner authentication information being associated with said received identity authentication information by said user record.

25. The authentication method according to claim 24, wherein
said step of storing includes the step of storing the user record further including restriction information for restricting processing executable by respective ones of said plurality of information processing apparatuses, and
said first permission step and said second permission step each include the step of transmitting said restriction information together with said permission signal.

26. The authentication method according to claim 24, wherein said first permission step includes the step of, when login has already been permitted based on said received identity authentication information, transmitting a logout instruction to the information processing apparatus that had previously transmitted said identity authentication information.

27. The authentication method according to claim 24, wherein said second permission step includes the step of, when login has already been permitted based on said received owner authentication information, transmitting a logout instruction to the information processing apparatus that had previously transmitted said owner authentication information.

28. The authentication method according to claim 24, further comprising a step of storing a history of permission of login in one of said first permission step and said second permission step.

29. An authentication program embodied on a computer readable medium for causing a computer to execute processing including:
a step of storing a user record including identity authentication information for authentication of identity of a user and owner authentication information for identification of the user;
an identity authentication step of comparing identity authentication information received from one of a plurality of information processing apparatuses with said identity authentication information included in said user record for authentication;
a first permission step of transmitting a permission signal permitting login based on said identity authentication information authenticated in said identity authentication step to said one of said plurality of information processing apparatuses that transmitted said identity authentication information;
an owner authentication step of comparing owner authentication information received from one of said plurality of information processing apparatuses with said owner authentication information included in said user record for authentication; and
a second permission step of transmitting a permission signal permitting login based on said owner authentication information authenticated in said owner authentication step to said one of said plurality of information processing apparatuses that transmitted said owner authentication information;
wherein said second permission step includes the steps of
transmitting, before permitting the login based on said received owner authentication information, a request for multiple logins to the information processing apparatus that permitted the previous login based on said identity authentication information, said identity authentication information being associated with said received owner authentication information by said user record, in a case where a user previously logged in using said identity authentication information continues to be logged in when one of the plurality of information processing apparatuses sends an authentication request based on said received owner authentication information, and
permitting the login based on said received owner authentication information on the condition that a permission instruction is received from said information processing apparatus to which said request for multiple logins was transmitted.

30. An authentication program embodied on a computer readable medium for causing a computer to execute processing including:
a step of storing a user record including identity authentication information for authentication of identity of a user and owner authentication information for identification of the user;
an identity authentication step of comparing identity authentication information received from one of a plurality of information processing apparatuses with said identity authentication information included in said user record for authentication;
a first permission step of transmitting a permission signal permitting login based on said identity authentication information authenticated in said identity authentication step to said one of said plurality of information processing apparatuses that transmitted said identity authentication information;
an owner authentication step of comparing owner authentication information received from one of said plurality of information processing apparatuses with said owner authentication information included in said user record for authentication; and
a second permission step of transmitting a permission signal permitting login based on said owner authentication information authenticated in said owner authentication step to said one of said plurality of information processing apparatuses that transmitted said owner authentication information;
wherein said first permission step includes the step of notifying, after permitting the login based on said received identity authentication information, of occurrence of multiple logins to the information processing apparatus that permitted the previous login based on said owner authentication information, in a case where a user previously logged in using said owner authentication information continues to be logged in when one of the plurality of information processing apparatuses sends an authentication request based on said received identity authentication information, said owner authentication information being associated with said received identity authentication information by the user record.

* * * * *